(12) United States Patent
Jorgensen

(10) Patent No.: US 6,796,208 B1
(45) Date of Patent: Sep. 28, 2004

(54) SAWDUST COLLECTION HOOD FOR TABLE SAW

(76) Inventor: Matthew Roy Jorgensen, 2836 26th Ave. NE., Olympia, WA (US) 98506

(*) Notice: Subject to any disclaimer, the term of this patent is extended or adjusted under 35 U.S.C. 154(b) by 0 days.

(21) Appl. No.: 09/253,110

(22) Filed: Feb. 19, 1999

(51) Int. Cl.[7] .............................................. B27G 19/02
(52) U.S. Cl. ........................... 83/100; 83/477.2; 83/478
(58) Field of Search .......................... 83/100, 397, 860, 83/478, 477.2, 102.1, 544–546

(56) References Cited

U.S. PATENT DOCUMENTS

| | | | |
|---|---|---|---|
| 648,000 A | * | 4/1900 | Thomas |
| 1,035,735 A | * | 8/1912 | Pogue |
| 1,553,996 A | * | 9/1925 | Federer |
| 1,563,317 A | * | 12/1925 | Auel |
| 1,570,628 A | * | 1/1926 | Flohr |
| 2,007,887 A | * | 7/1935 | Tautz |
| 2,425,331 A | * | 8/1947 | Kramer |
| 2,593,596 A | * | 4/1952 | Olson |
| 3,249,134 A | * | 5/1966 | Vogl et al. |
| 3,754,493 A | * | 8/1973 | Niehaus et al. ............... 83/478 |
| 3,880,032 A | * | 4/1975 | Green ....................... 83/102.1 |
| 4,063,478 A | | 12/1977 | Stuy |
| 4,192,104 A | * | 3/1980 | Patenaude .................... 51/273 |
| 4,206,672 A | * | 6/1980 | Smith ........................ 83/415 |
| 4,253,362 A | * | 3/1981 | Olson ........................ 83/100 |
| 4,367,665 A | | 1/1983 | Terpstra et al. |
| 4,403,534 A | | 9/1983 | Altendorf et al. |
| 4,517,869 A | | 5/1985 | Kuhlmann et al. |
| 4,576,072 A | | 3/1986 | Terpstra et al. |
| 4,875,398 A | | 10/1989 | Taylor et al. |
| 5,084,972 A | * | 2/1992 | Waugh ....................... 30/124 |

FOREIGN PATENT DOCUMENTS

DE              3615736         * 11/1987

* cited by examiner

Primary Examiner—Stephen Choi
(74) Attorney, Agent, or Firm—Kolisch Hartwell, P.C.

(57) ABSTRACT

A sawdust collection hood for a table saw. The hood has an identical pair of vertical, spaced-apart side panels, an upper cowl mounted between the side panels, a canted nose panel mounted between front portions of the side panels, and a lower cowl that extends rearwardly between the side panels below the upper cowl from a forward edge of the lower cowl disposed over a trailing edge of the nose panel. A pair of side skirts suspended from each of the side panels, extend rearwardly from the nose panel, and are movable between a raised and a lowered position. When placed upon the saw work table, straddling the saw blade, and with side skirts lowered, a work piece moved rearward against the canted nose panel causes the hood to rise. As the work piece progresses rearwardly past the saw blade, the side skirts remain lowered, resting on the work piece, until the work piece just clears the nose panel, whereupon the hood drops down to the work table, raising the skirts relative to the nose panel and closing a gap that would otherwise permit sawdust to escape below the front of the hood. The hood may be pivotally attached to a table saw splitter or, alternatively, may be pivotally attached by a collar joint to an overhead vacuum conduit assembly.

5 Claims, 25 Drawing Sheets

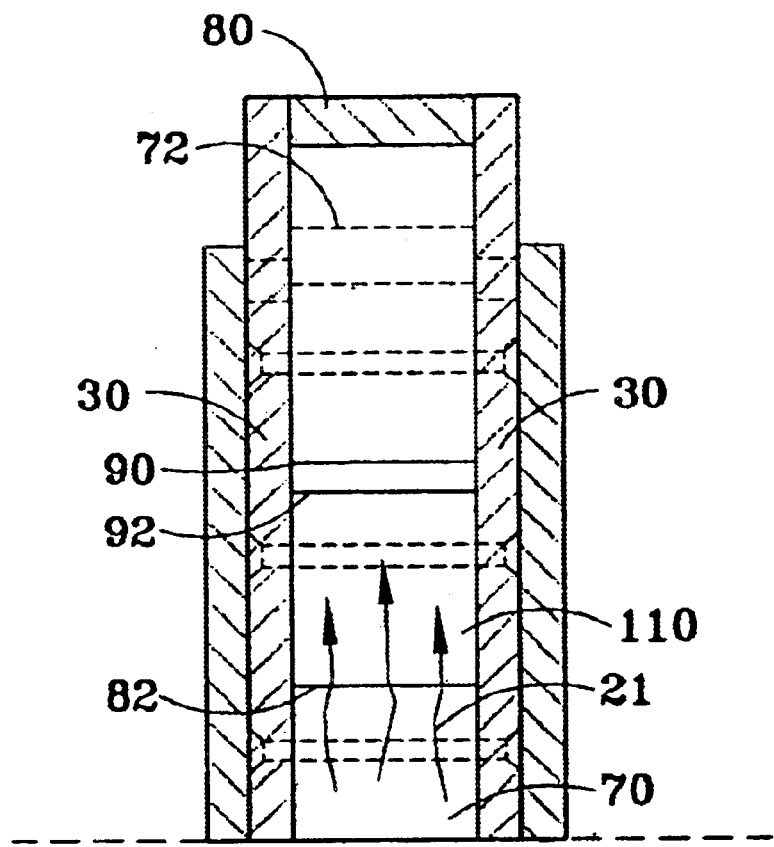
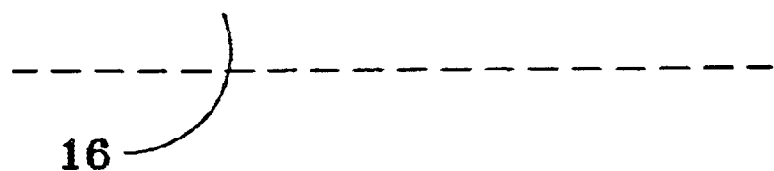
FIG. 4

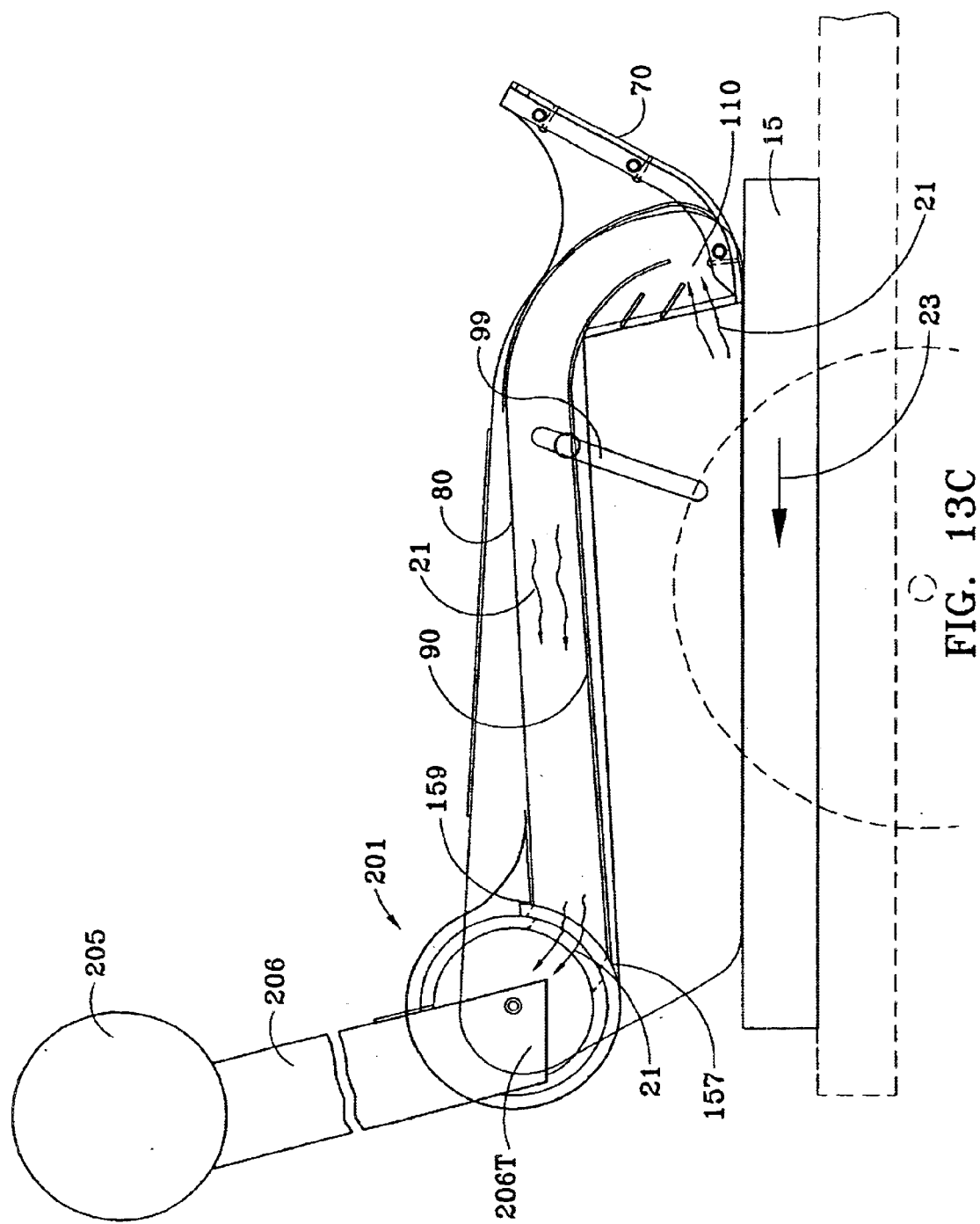

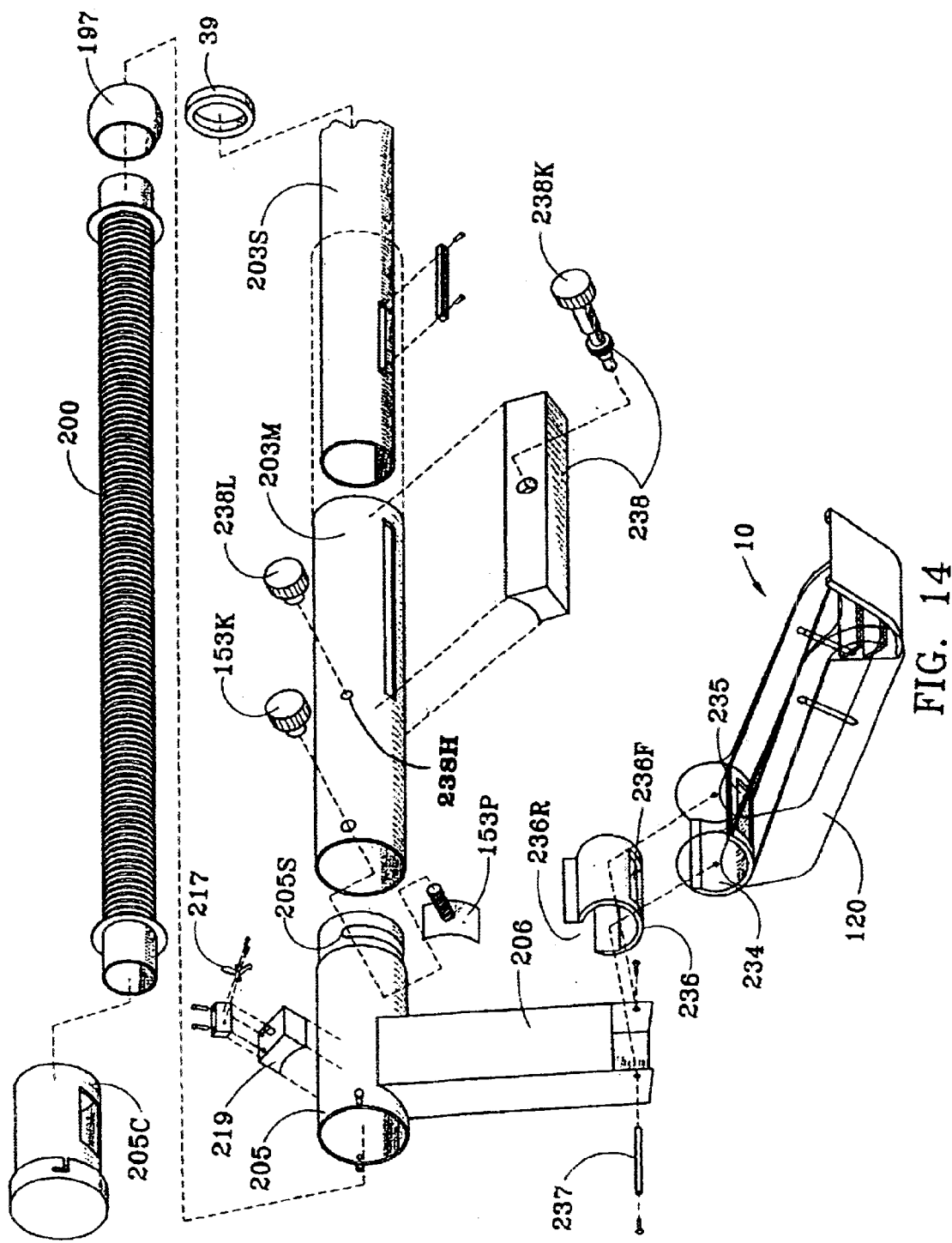

SAWDUST COLLECTION HOOD FOR TABLE SAW

BACKGROUND OF THE INVENTION

1. Field of the Invention

This invention relates to a movable, protective, sawdust collection hood for use with a table saw equipped with a rotary saw blade and, more particularly, to such a hood that provides a directed air stream for removal of sawdust generated by a saw blade rotating on a shaft located below a work table.

2. Background Art

Protective hoods have become widely used to remove sawdust generated by the cutting of a work piece on a rotary table saw, and to conduct the dust toward a sawdust collection receptacle. The hoods have additionally served to protect the user thereof from injury due to inadvertent contact with a rotating saw blade. Such hoods have generally taken the form of a longitudinally elongated enclosure, open at the bottom, having a pair of spaced-apart vertical walls joined at their upper edges by a top wall, and adapted for placement over an exposed, upper peripheral portion of a saw blade, the saw blade being mounted for rotation on a shaft located below the work table of the table saw. Protective hoods of this kind have been configured such that air was drawn into the hood through an air intake opening (due to an air current created by rotation of the saw blade and/or by an attached vacuum or blower system), from whence air streamed across the blade and out a discharge opening toward a sawdust collection receptacle, carrying the sawdust away with it. Retractable apparatus was provided to support the hood in position over the saw blade for example, by a link arm having one end attached to the hood and an opposite end attached to a splitter mounted to the table saw behind the saw blade. Attached to a front portion of the vertical walls was a forwardly inclined nose having horizontal leading and trailing edges, such that rearward advancement of a work piece toward and against the nose panel caused the hood to rise, and with further such movement of the work piece the trailing edge of the nose rested on and made sliding contact with an upper surface of the work piece. An example of protective hoods of this kind is disclosed in U.S. Pat. No. 4,576,072 to Terpstra et al. An alternative retractable support for such a protective hood, i.e., a parallelogram linkage and counterbalance mechanism, was disclosed in U.S. Pat. No. 4,875,398 to Taylor et al.

Such heretofore known protective hoods, however, failed to adequately remove sawdust and chips generated at the final stage of a cutting operation. Initially, during a cutting operation, so long as a work piece progressed rearwardly under the hood, across the upper surface of the work table and past the saw blade, sawdust and chips generated within the hood remained confined within the hood to be carried away by the air stream within the hood. But, after the cutting of a work piece had progressed to the stage at which the forwardmost portion of the work piece had moved underneath and rearward of a front portion of the hood, a gap was created between the hood and the work piece, thereby permitting sawdust and chips to be thrown forward through the gap and to escape from the hood. My invention overcomes this problem by eliminating the gap at the final stage of cutting a work piece.

SUMMARY OF THE INVENTION

According to the present invention there is provided a protective, sawdust collection hood for a table saw. The table saw is equipped in conventional fashion with a saw blade mounted for rotation on a shaft located below a horizontal work table, and having an exposed, peripheral portion thereof extending above the worktable and rotating toward the front side of the work table. The table saw is also equipped with a splitter mounted directly behind the saw blade. In a first embodiment, the hood is adapted for pivotal attachment to the splitter, whereby the hood can be moved between a retracted, storage position and a working position directly over and straddling the exposed portion of the saw blade. The hood includes a pair of spaced-apart, vertical side panels, each side panel having a front, central and rear portion. A forwardly inclined nose panel is mounted between front portions of the side panels, and has horizontal leading and trailing edges. An upper cowl is mounted between the side panels, and has a substantially vertical, front portion terminating at a forward edge that engages an upper surface of the nose panel, and has a rearwardly extending, upwardly inclined portion terminating at a rear edge. A lower cowl is mounted between the side panels below the upper cowl and has a substantially vertical, front portion and rearwardly extending, substantially horizontal, central and rear portions. The front portion of the lower cowl terminates in a horizontal forward edge disposed above the trailing edge of the nose panel. A pair of vertical side skirts are provided, each of the skirts being movable between a first, lowered position and a second, raised position, and means are attached to the side panels for suspending a side skirt from each of the side panels. In this first embodiment, each of the side skirts has a substantially vertical slot, and the means for suspending the side skirts include a slot pin attached to and extending laterally outward from a central portion of the adjacent side panel, retainer means attached to each slot pin for retaining the pin within the slot, and stop means attached to the side skirts for limiting the downward movement of the side skirts when the hood is raised away from the work table. The side panels, upper cowl, lower cowl, and side skirts are made of a rigid transparent material so that an operator of the table saw can see through the hood to monitor cutting operations.

During the initial stages of cutting a work piece, the side skirts are in the lowered position, the lower edge of each skirt being just even with the trailing edge of the nose panel. As the work piece is then moved rearwardly across the work table toward and against the nose panel, the hood rises until the trailing edge of the nose panel rests upon an upper surface of the work piece, thereby completing the initial stage. There then follows an intermediate cutting stage, wherein the work piece progresses rearwardly toward and past the saw blade with the trailing edge continuing to rest on, and make sliding contact with an upper surface of the work piece. During the intermediate stage, the side skirts remain in the lowered position. The final cutting stage occurs when the forwardmost portion of the work piece has been moved rearward underneath the side skirts and has fully cleared the nose panel; at that time the nose panel drops down to the work table, thereby closing the gap that would otherwise exist between the upper surface of the work table and the hood, and the side skirts move up into the raised position. Thereafter, once the work piece has fully cleared the saw blade and the side skirts, the side skirts also drop down from the raised position to the lowered position and come to rest on the work table. The cut having been completed, the cut portions of the work piece can then be removed from the work table.

Throughout each of the stages of cutting a work piece, sawdust is carried by a directed stream of air away from the situs of cutting within the hood and toward a sawdust collection receptacle. Air enters the hood through an intake opening defined by rear portions of the side skirts and a rear portion of the lower cowl, thence streams forward over the work piece and saw blade and through an orifice defined by the forward edge of the lower cowl, the trailing edge of the nose panel and the front portions of the side panels, and thereafter is conducted rearwardly between an upper surface of the lower cowl and a lower surface of the upper cowl to exit the hood. In this manner, sawdust and chips generated by cutting a work piece, including that generated in the final stage of cutting, remains confined within the hood while being conducted toward a collection receptacle.

Although rotation of the saw blade is sufficient to create the above-described air stream, the air stream flow rate can be increased by attaching a vacuum source to the hood. Therefore, in a preferred embodiment, the hood further includes a rear discharge wall mounted between an upper surface of a central portion of the lower cowl and the rear edge of the upper cowl. The rear discharge wall has an air discharge hole. A vacuum hose adapter is attached to a rear surface of the rear discharge wall and is aligned with the air discharge hole. A vacuum hose having one end connected to the adapter, and an opposite end attached to a shop vacuum or other vacuum source, provides vacuum suction to the hood for increased air flow through the hood.

In a second embodiment of the hood, the hood is pivotally attached to the splitter by two pairs of parallel, equal-length links, forming a parallelogram linkage. In this embodiment, each of the slots in the side skirts is arcuate and the above-described means for suspending the side skirts further includes a first pair of parallel, equal-length, skirt support arms disposed on opposite sides of the hood, each of said support arms having a first end pivotally attached to a side panel and a second, opposite end pivotally attached to a front portion of a side skirt; and said means further includes a second pair of parallel, equal-length, skirt support arms disposed on opposite sides of the hood, each of said support arms having a first end pivotally attached to a side panel and a second, opposite end pivotally attached to an upper rear portion of a side skirt.

In a third embodiment, the hood further includes a vacuum conduit assembly for drawing sawdust and wood chips away from the saw blade and through the hood to a collection receptacle. A collar joint is provided for pivotally attaching a rear portion of the hood to the vacuum conduit assembly, which permits rotation of the hood about a horizontal axis between a raised, storage position and a lowered, working position. The vacuum conduit assembly comprises a vacuum source connected to an electric power source; a laterally disposed, elongated, cylindrical, hollow boom having an intake end and an opposite discharge end; a hollow, cylindrical head stock mounted to the intake end of the boom and coaxial therewith, said head stock having an intake duct extension in communication with the interior of the head stock, and said intake duct being attached to, and in communication with, the collar joint; a movable vacuum hose within the boom, having a first, intake end storable within the head stock, and an opposite, discharge end with an attached hose end ring seal that is slidable within the boom; and a stationary vacuum hose having one end attached to the discharge end of the boom and an opposite end attached to the vacuum source. In this manner, a vacuum created by the vacuum source is communicated through the stationary and movable hoses to the head stock and thence to the hood.

The collar joint comprises a first, semicylindrical, partial collar attached to an intake end of the vacuum conduit assembly, said partial collar being axially-aligned on a lateral axis A'—A' and extending between rear portions of the side panels, and said collar having longitudinally-aligned, front and rear openings. The collar joint further comprises a second, semicylindrical, partial collar that partially surrounds and engages the first partial collar. The second partial collar is rotatable about the lateral axis A'—A' and about a front, exterior surface of the first partial collar. The second partial collar is mounted between a rear edge of the lower cowl and a rear edge of the upper cowl, and is laterally disposed between rear portions of the side panels. The second partial collar has an air discharge hole that is in register with the front opening of the first partial collar when the hood is in a working position directly over and straddling the saw blade. A collar pin is laterally inserted along axis A'—A' through the rear portions of the side panels, through tab projections from the intake end of the vacuum conduit assembly, and through the first and second partial collars. Preferably, the boom comprises a stationary portion and, in telescoping relation thereto, a laterally movable portion. The laterally movable portion of the boom is attached to the head stock. A rack and pinion assembly couples the laterally movable portion to the stationary portion of the boom, thereby permitting lateral adjustments of the position of the hood with respect to the saw blade and fence. A normally-closed, momentary switch, wired in series with the vacuum electric power source, is mounted on the head stock, such that, whenever the hood is moved to the raised, storage position adjacent the head stock, the momentary switch is opened, thereby de: energizing the vacuum source. For locking the hood in the raised, storage position, the nose panel has a retainer aperture engagable by a spring catch mounted on the head stock. The head stock is provided with a removable cap, whereby, with the cap removed, the intake end of the movable vacuum hose may be withdrawn from the head stock and used to vacuum clean the table saw and its immediate environs, and thereafter replaced inside the head stock.

Important objectives of the present invention therefore include the following:

It is an object of the invention to provide a protective hood for a rotary table saw that carries sawdust and chips away from the situs of cutting and toward a sawdust receptacle, even during the final stage of cutting a work piece.

It is a further object of the invention to provide such a protective hood that is movable between a retracted and a working position directly over and straddling the saw blade.

The above and other aspects and advantages of the present invention will become more apparent from the following detailed description taken in conjunction with the drawings.

BRIEF DESCRIPTION OF THE DRAWINGS

FIG. 4 is a cross sectional view of the hood of FIG. 2A taken along the line 4—4.

FIG. 13C is an enlarged, partial, left side elevational view thereof, after the work piece has moved rearwardly under the nose panel and underneath the side skirts, showing the side skirts in a raised position;

FIG. 14 is an exploded view of the collar joint and attached vacuum conduit assembly.

Figure 2A:
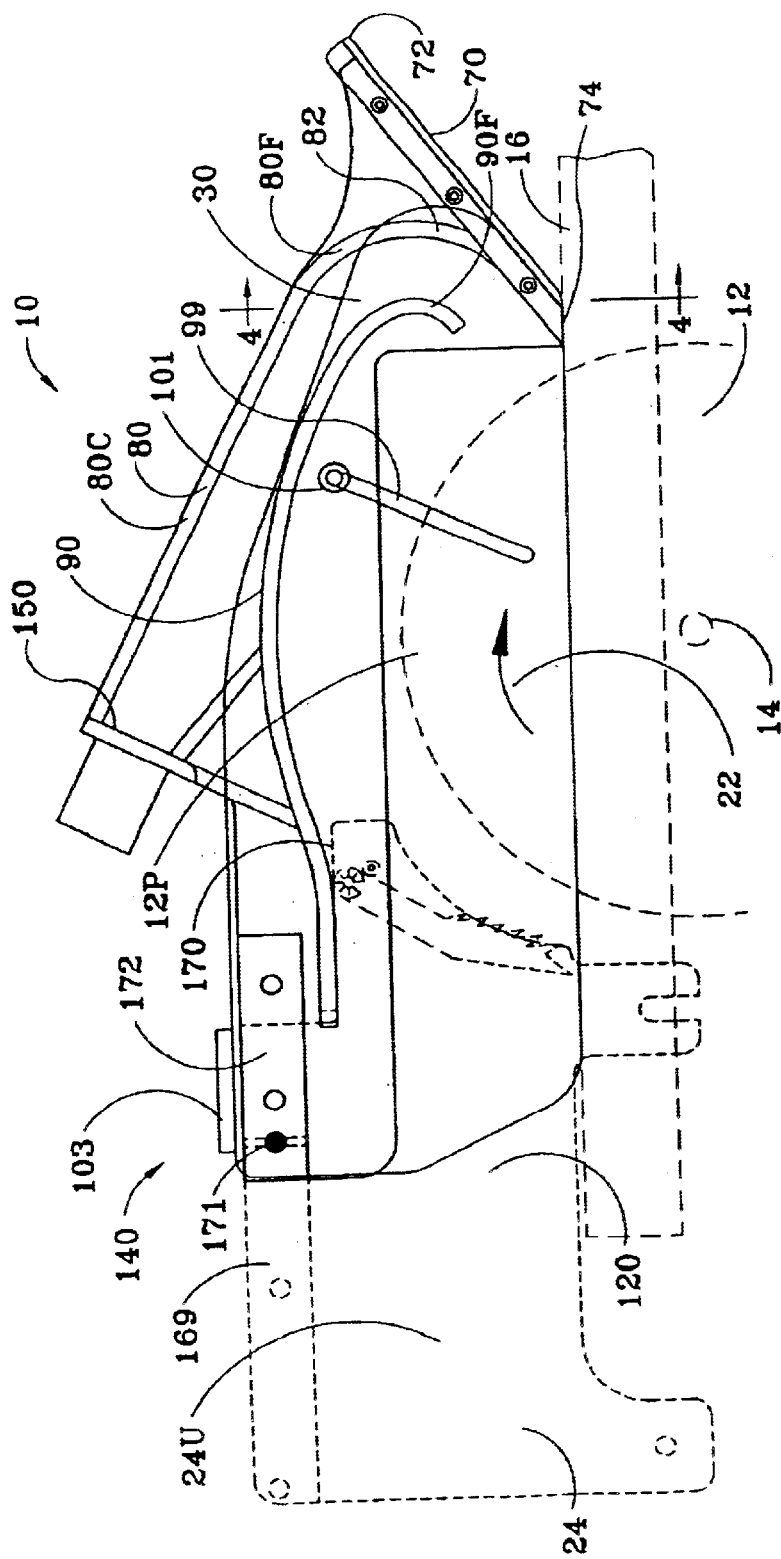
FIG. 2A is an enlarged, left side view thereof.
Figure 2B:
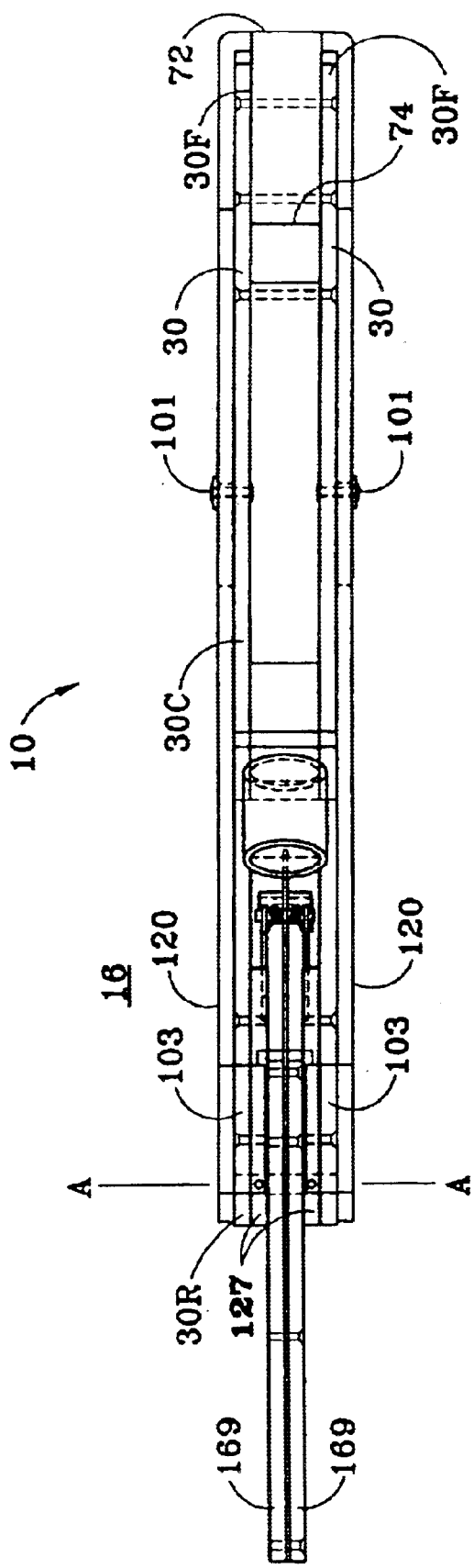
FIG. 2B is an enlarged top plan view thereof.
Figure 2C:
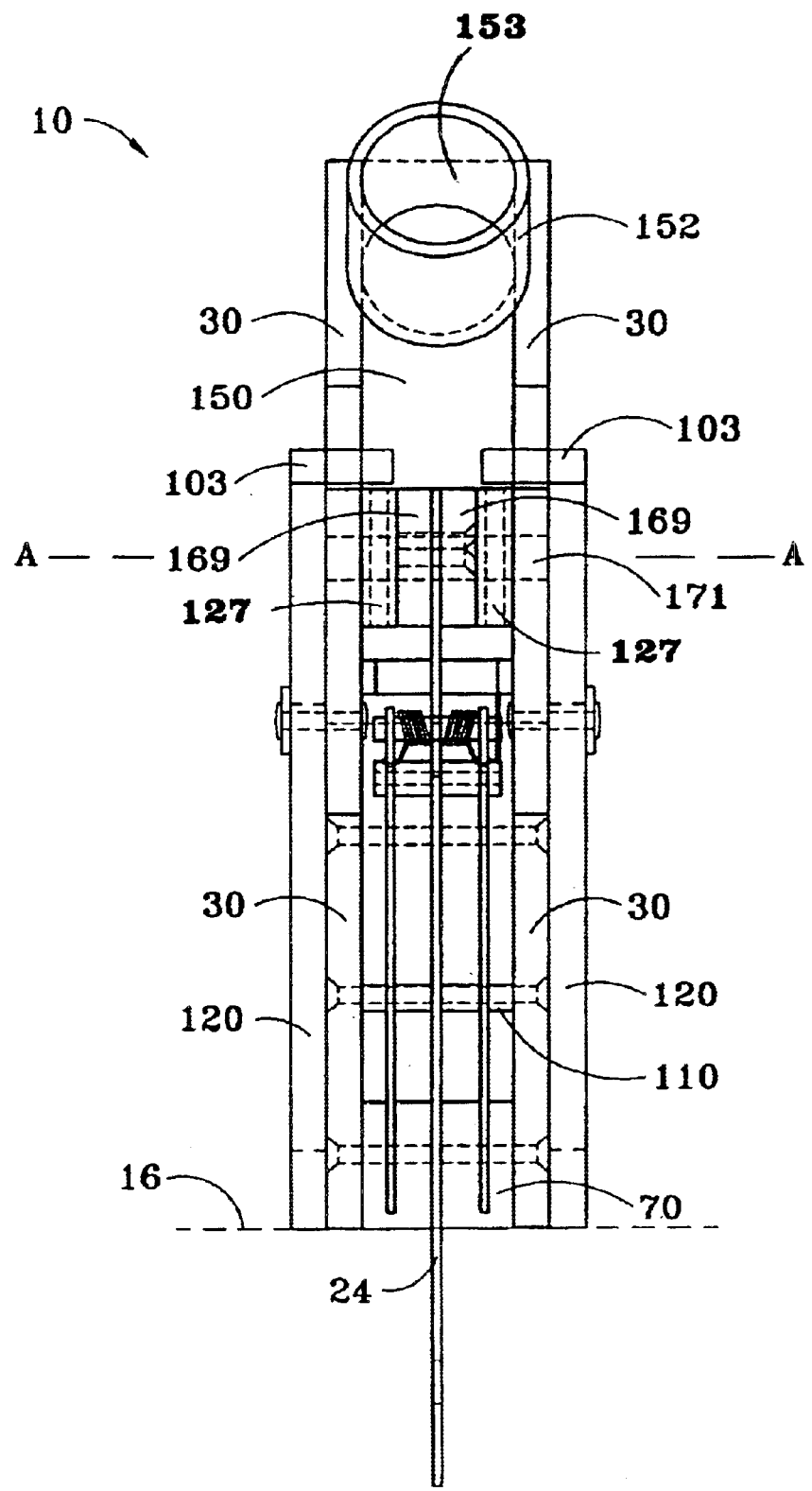
FIG. 2C is an enlarged, rear elevational view thereof.

The terms "front" and "forward" will be understood to refer to portions of the hood and the table saw that are depicted on the right of FIG. 2A, and the terms "rear" and "rearward" refer to portions that are depicted on the left therein.

DETAILED DESCRIPTION OF THE PREFERRED EMBODIMENT

Referring now to FIGS. 1, 2A, 2B and 2C, a movable, protective hood 10, denoted generally by the numeral 10, is shown in a working position directly over and straddling a rotary saw blade 12 mounted on a drive shaft 14 located below a flat, horizontal work table 16 of a rotary table saw 18. An exposed, upper, peripheral portion 12P of the saw blade 12 protrudes through a slot (not shown) in the work table 16 and, as denoted by arrow 22, rotates forwardly toward a front edge 16F of the work table 16. The table saw 18 is equipped with a splitter 24, shown in dashed outline, mounted to a rear portion 16R of the work table 16. The splitter 24 is aligned with, and disposed directly behind, the saw blade 12. In this first embodiment of the hood, the hood 10 is pivotally mounted to the splitter 24, as described below.

Figure 5:
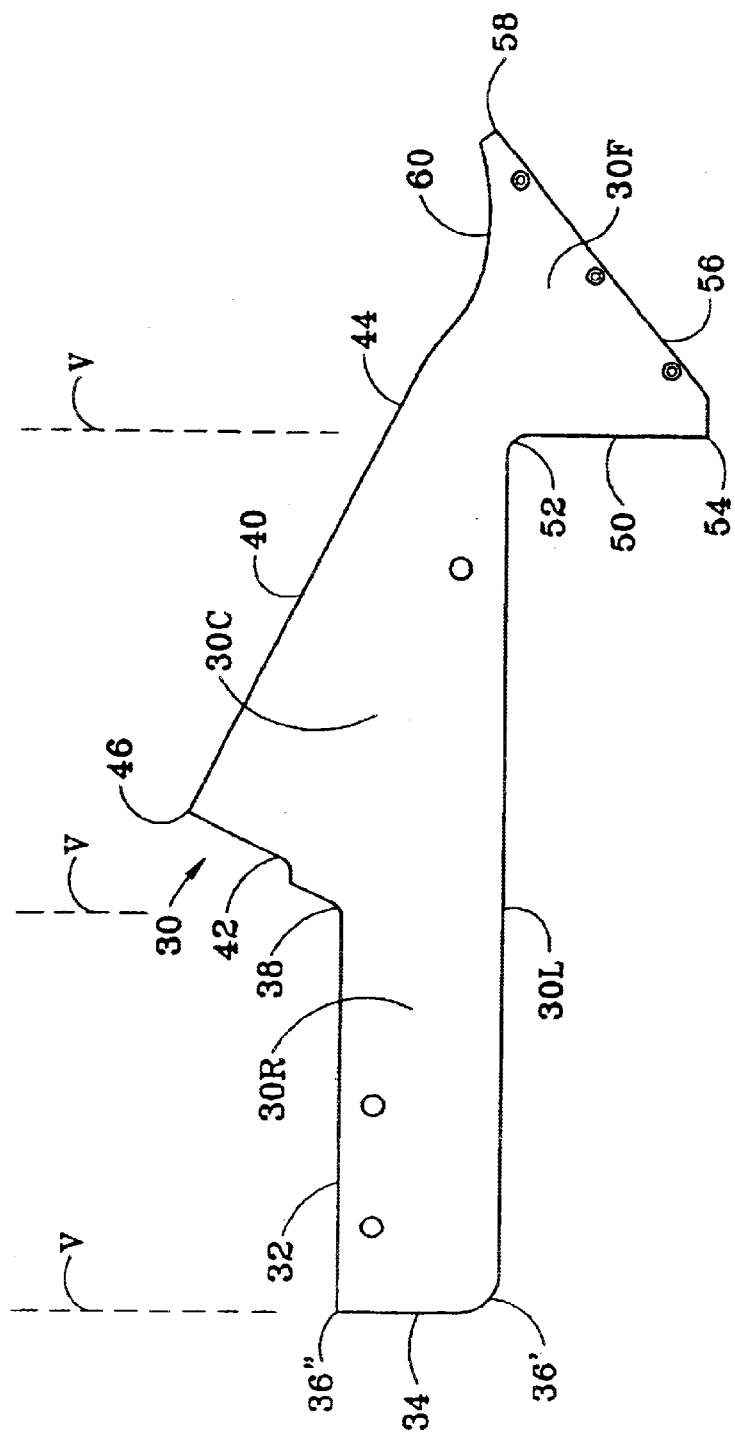
FIG. 5 is a left side elevational view of one side panel of the hood removed from the first embodiment of the hood.

The hood 10 comprises a pair of spaced-apart vertical side panels 30 of identical size and shape, each side panel being longitudinally elongated from front to rear and having front and rear portions joined by an intermediate central portion, denoted as 30F, 30R, 30C, respectively, as may best be seen in left side elevational view in FIG. 5, wherein, for ease of reference, the defined portions are depicted as being divided one from the next by vertical dashed lines V. Each of the side panels 30 are relatively thin, flat, and of uniform thickness, as may be seen in FIGS. 2B and 2C. In this first embodiment, the rear portion 30R is rectangular, being defined by a relatively long, lower edge 30L and a relatively short, upper horizontal edge 32, and by a relatively short, rear vertical edge 34 extending between terminuses 36', 36" of lower edge 30L and upper edge 32, respectively. The upper edge 32 extends forward about one-third the length of the lower edge 30L from rear terminus 36" to a front terminus 38. In addition to lower edge 30L, the central portion is defined by a substantially straight, upper edge 40 that is upwardly and rearwardly canted from the front portion 30F, and defined further by a concave, forwardly and upwardly canted, rear edge 42 that extends from terminus 38 and intersects upper edge 40 at terminus 46. The front portion 30F extends generally forwardly of, and below, the lower edge 30L. The front portion 30F is defined by a straight, substantially vertical, rear edge 50 that extends downward from a forward terminus 52 of the lower edge 30L to a lower terminus 54; a forwardly and upwardly canted nose edge 56 that extends from terminus 54 to a terminus 58; and a concavely curved upper edge 60 that extends rearwardly from terminus 58 to terminus 44.

Figure 3A:
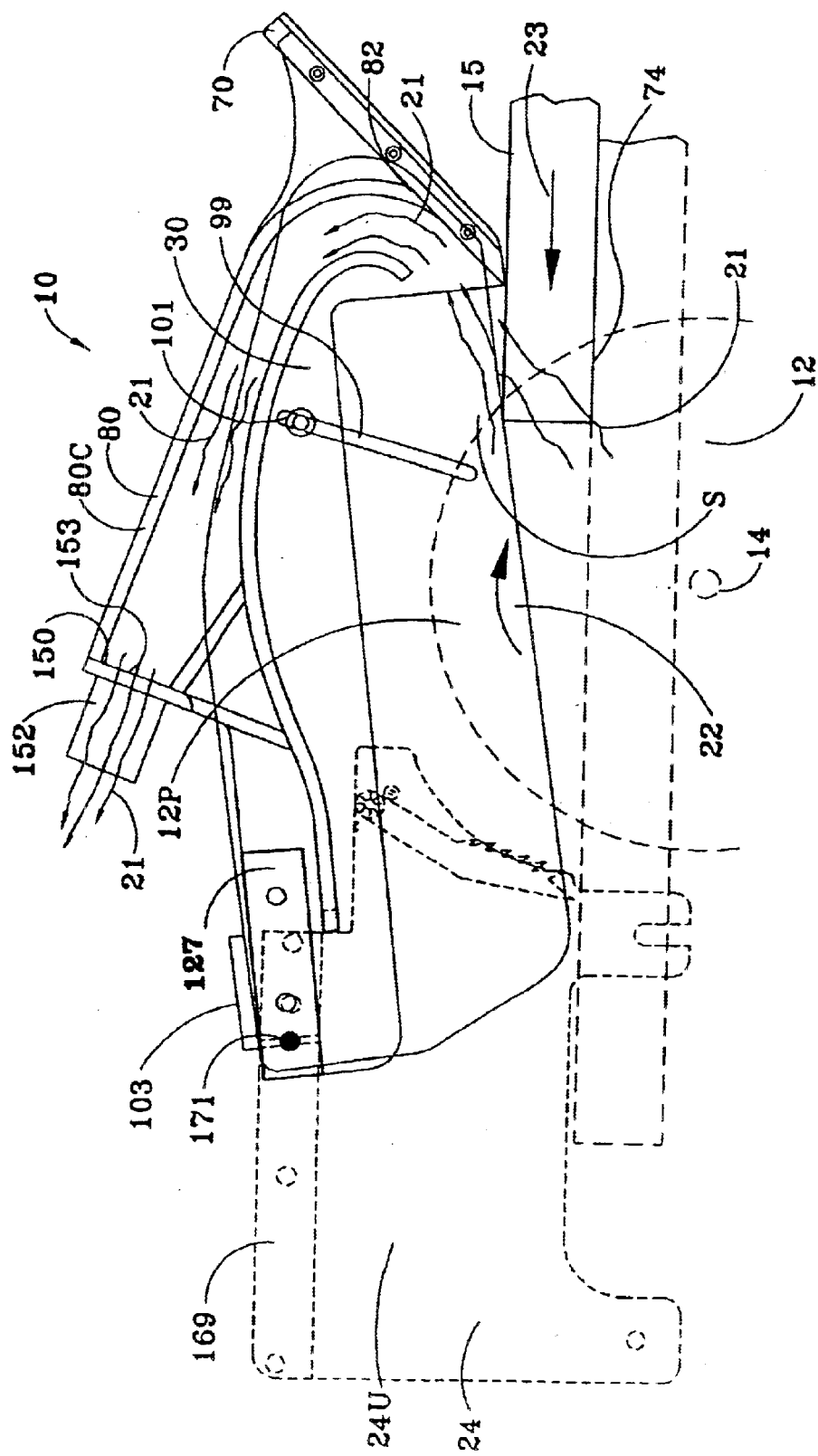
FIG. 3A is a left side view thereof showing the hood in a raised, working position after a work piece has been moved rearwardly under the nose panel and partially underneath the side skirts, preparatory to entering upon cutting by a rotating saw blade, and further showing the side skirts in a lowered position relative to the nose panel.

The hood 10 further comprises a forwardly and upwardly inclined nose panel 70 mounted between the front portions 30F of the side panels 30 adjacent the nose edges 56 and extending from terminuses 54 to 58 thereof. The nose panel 70 has a horizontal leading edge 72 extending laterally between terminuses 58 and a horizontal trailing edge 74 extending laterally between terminuses 54. The trailing edge 74 is horizontally chamfered, as are the nose edges 56 adjacent terminuses 54, to facilitate smooth, sliding contact with an upper surface of a work piece 15 when moved underneath the hood 10 in the direction of arrow 23 during a cutting operation; see FIG. 3A.

An upper cowl 80 is mounted between the side panels 30, and extends rearwardly and upwardly from the front portion 30F and over the central portion 30C thereof. A front portion 80F of the upper cowl 80 has a forward edge 82 that engages an upper surface of the nose panel 70 at a location intermediate between the leading and trailing edges 72, 74. The front portion 80F extends upwardly from forward edge 82 and thence rearwardly to terminuses 44. From terminuses 44 the central portion 80C extends upwardly and rearwardly, adjacent upper edges 40, to terminuses 46.

A lower cowl 90 is mounted between the side panels 30 below the upper cowl 80. The lower cowl 90 has a substantially vertical, front portion 90F and a rearwardly extending, substantially horizontal, central and rear portion 90C, 90R, the front portion 90F terminating in a horizontal, forward edge 92 disposed above the trailing edge 74 of the nose panel 70. The combination of the side panel front portions 30F, the nose panel 70 and the forward edge 92 of the lower cowl 90 define an orifice 110 to permit air and sawdust to stream away from the saw blade 12 and the situs of cutting S; see, for example, FIGS. 3A and 4.

Figure 3B:
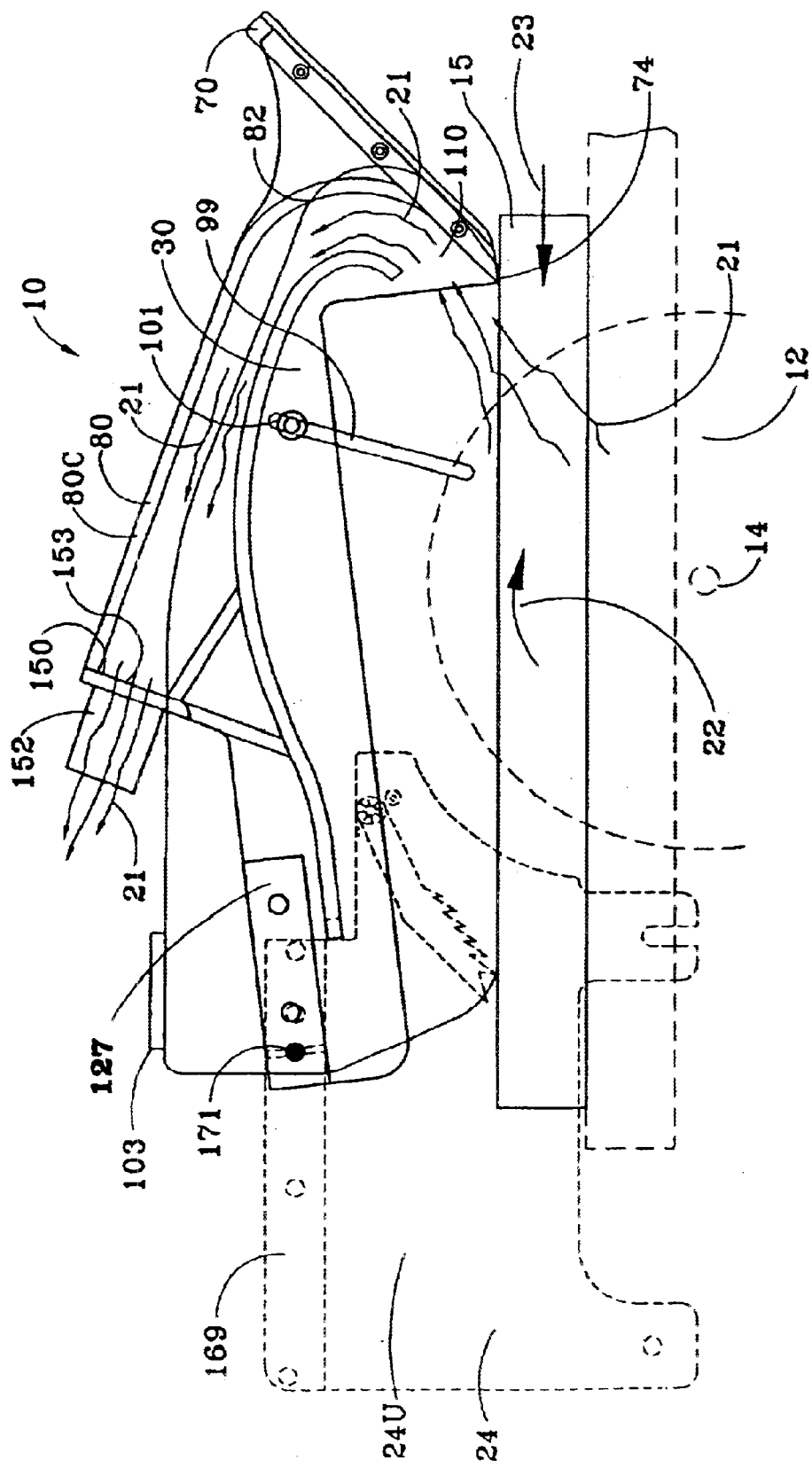
FIG. 3B is a left side view thereof, after the work piece has moved rearwardly under the nose panel and underneath the side skirts, showing the side skirts in a raised position.
Figure 3C:
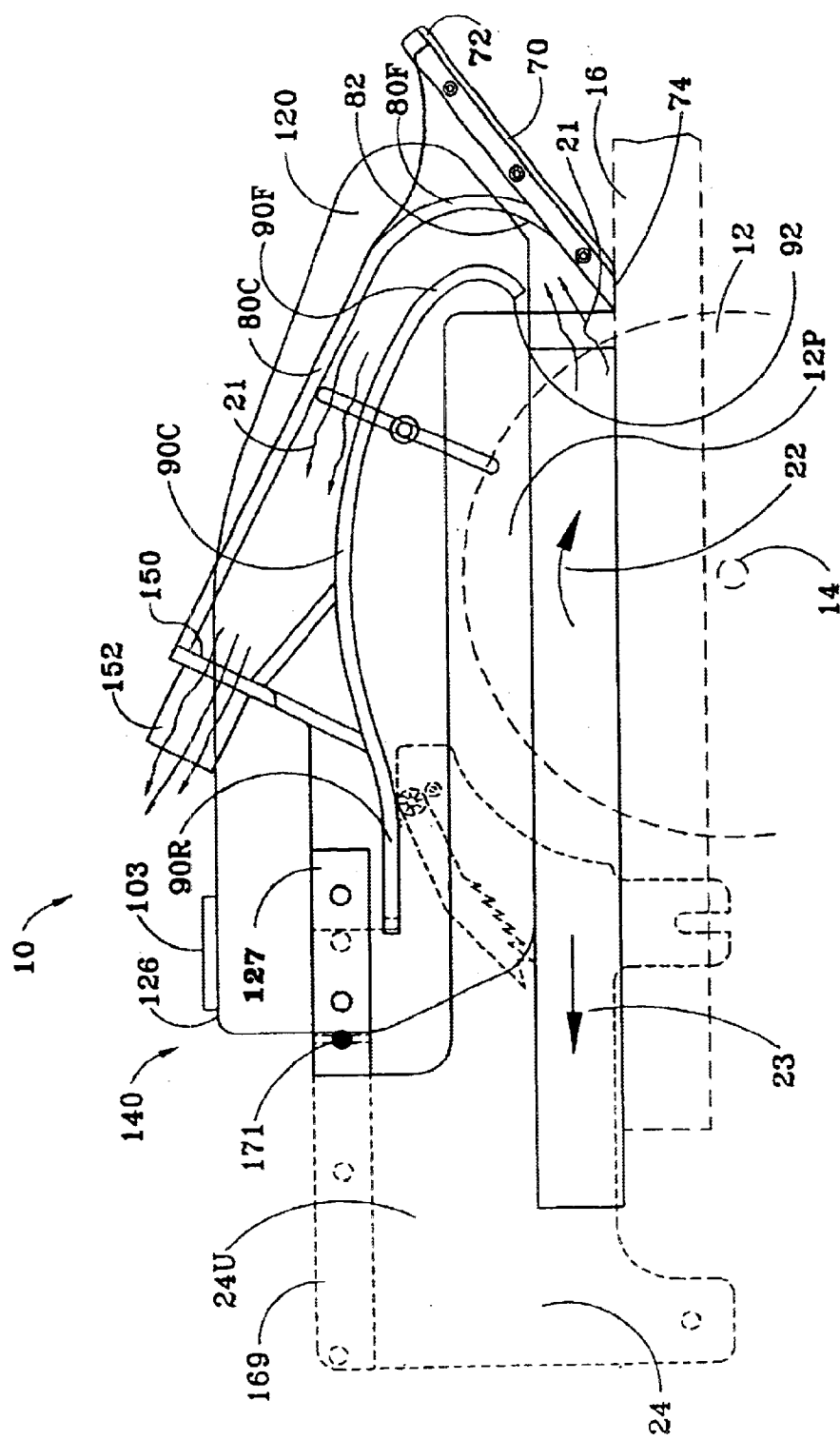
FIG. 3C is a left side view thereof, showing the hood dropped down onto the work table with the side skirts still in a raised position, the forwardmost portion of the work piece having moved past the saw blade but not yet having cleared the side skirts.
Figure 3D:
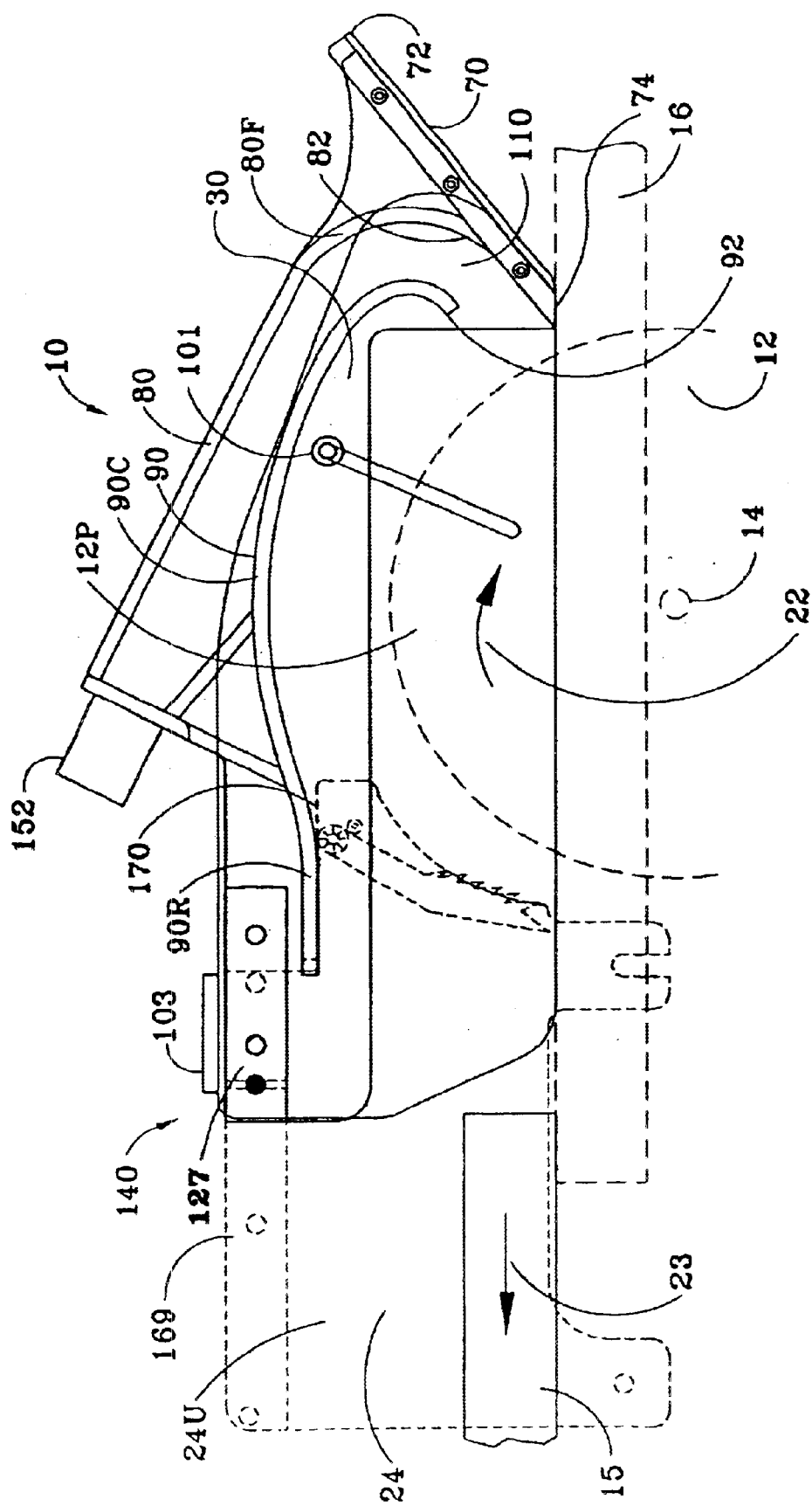
FIG. 3D is a left side view of the hood after the forward-most portion of the work piece has cleared the side skirts, showing the side skirts returned to a lowered position.
Figure 6:
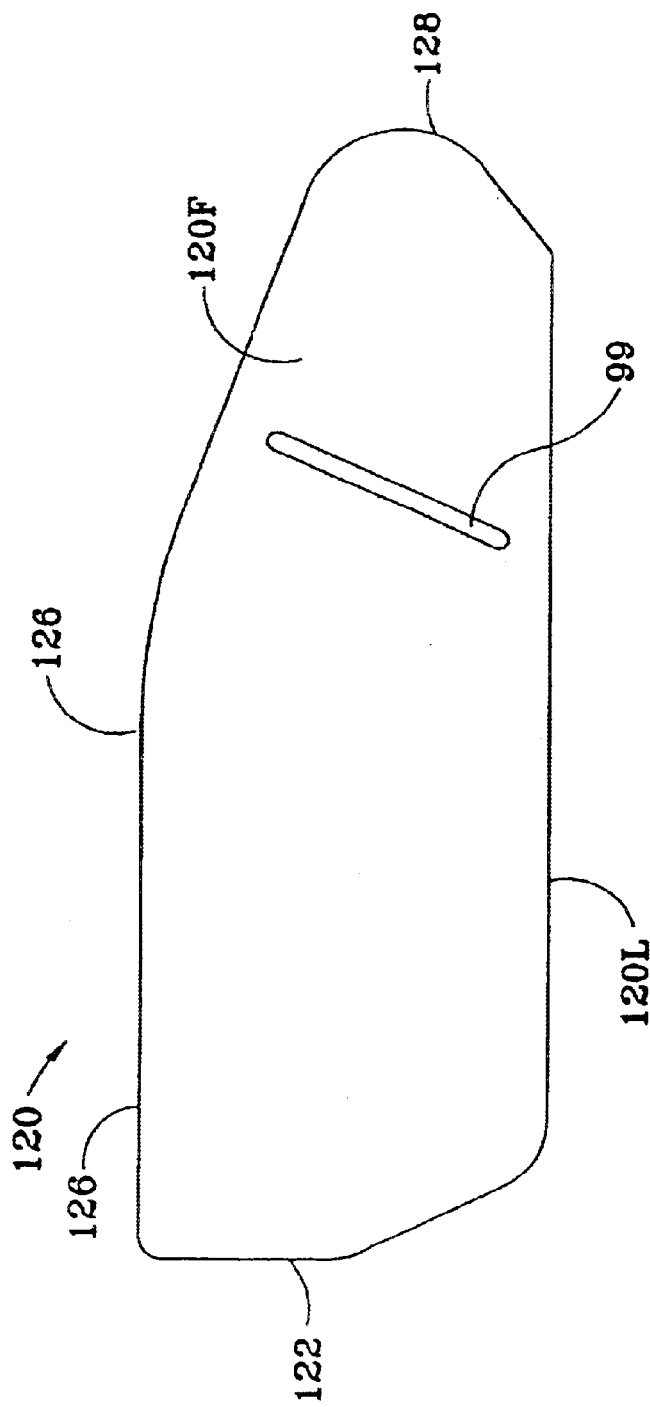
FIG. 6 is a left side elevational view of one side skirt of the hood removed from the first embodiment of the hood.

One each of a pair of vertical side skirts 120 of identical size and shape is suspended from an exterior surface of each of the side panels 30, and is movable between a first, lowered position, as depicted, for example, in FIGS. 2A, 2C, 3A, and 3C, and a second, raised position, as depicted in FIG. 3B. Referring particularly to FIG. 6, each side skirt 120 is a thin, flat panel of uniform thickness, elongated from front to rear, and defined by a substantially vertical rear edge 122, a convex leading edge 128, a straight, horizontal lower edge 120L extending rearward from a lower end of the leading edge 128 to a lower end of the vertical rear edge 122, and a substantially horizontal upper edge 126 extending rearward from an upper end of the leading edge 128 to an upper end of the rear edge 122.

In this first embodiment, a parallel pair of horizontal, in elongated, reinforcement struts 169 are attached to, and extend longitudinally along, opposite sides of an upper portion 24U of the splitter 24. Each of the struts 169 is made of metal, preferably aluminum. A parallel pair of equal-length, pivot arms 127, are disposed on opposite sides of the pair of struts 169. The arms 127 are also preferably aluminum. Each of the arms 127 has a first end pivotally attached to the splitter 24 by a first pivot pin 171 that extends laterally along an axis A—A through aligned apertures in said first ends, the splitter 24 and the struts 169. Each of the arms 127 has an opposite, second end rigidly attached to a side panel 30. Accordingly, the hood 10 may be rotated about lateral axis A—A between a raised, storage position and a lowered, working position.

For this first embodiment, each of the side skirts 120 has a slot 99, which preferably is canted forwardly and upwardly at about 30 degrees declination from vertical. A preferred means for suspending each side skirt 120 from an adjacent side panel 30 includes a slot pin 101 attached to, and extending laterally outward from, a central portion of said side panel 30 and through said slot 99. Each slot pin 101 has a retainer means for retaining the pin 101 within the slot 99 and for retaining a side skirt 120 adjacent to the nearest side panel 30; for this purpose, preferably each slot pin 101 has an internally threaded recess for receiving a round head bolt in threaded engagement therewithin, a retaining washer being interposed between the head of the bolt and an exterior surface of the side skirt 120. The means 140 further includes stop means 103 attached to the side skirts 120 for limiting the extent of downward movement of the side skirts 120 when the hood 10 is raised away from the work table 16. The stop means 103 preferably comprises a longitudinally-elongated barrier attached to an upper, rear edge 126 of each of the side skirts 120 and cantilevered laterally inward over the adjacent upper rear edges of the side panels 30 for abutting engagement therewith when the skirts 120 are in a lowered position.

Figure 1:
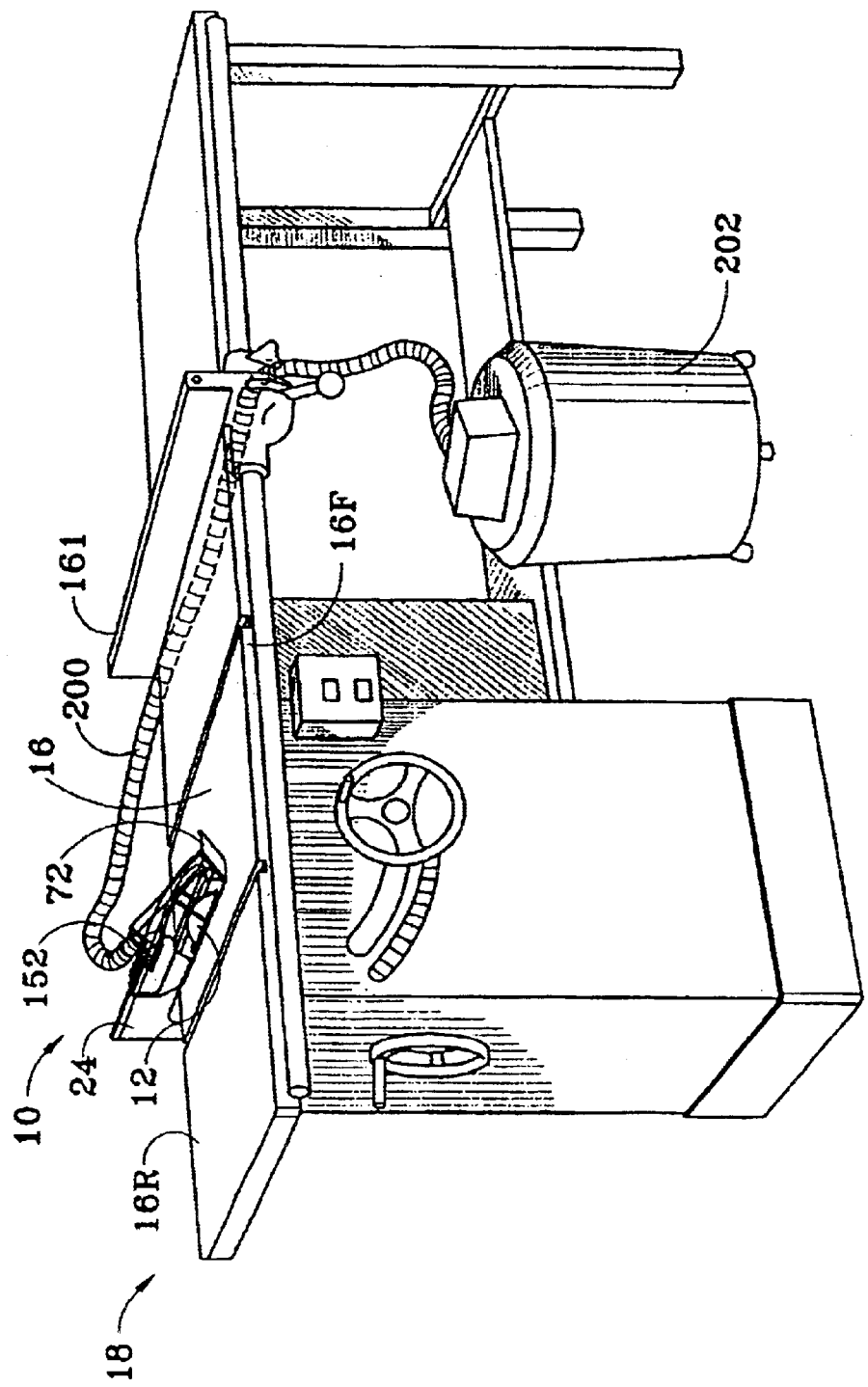
FIG. 1 is a perspective view of a rotary table saw as viewed from a position at the front, left of the saw, and showing a first embodiment of the movable, protective hood, mounted by a single pivot to a splitter, and in a working position resting upon the work table.

The first embodiment of the hood 10 further includes a rear discharge wall 150 mounted between an upper surface of a central portion 90C of the lower cowl 90 and the rear edge 159 of the upper cowl 80, and between central portions 30C of the side panels 30. The rear discharge wall 150 has a centrally disposed hole 153 to permit air and sawdust to exit the hood 10. A vacuum hose adapter 152 is attached to a rear surface of the rear discharge wall 150 and is aligned with the hole 153 therein. As shown in FIG. 1, one end of a vacuum hose 200 attaches to the adapter 152 and an opposite end thereof attaches to a vacuum source, such as a shop vac 202.

Figure 7:
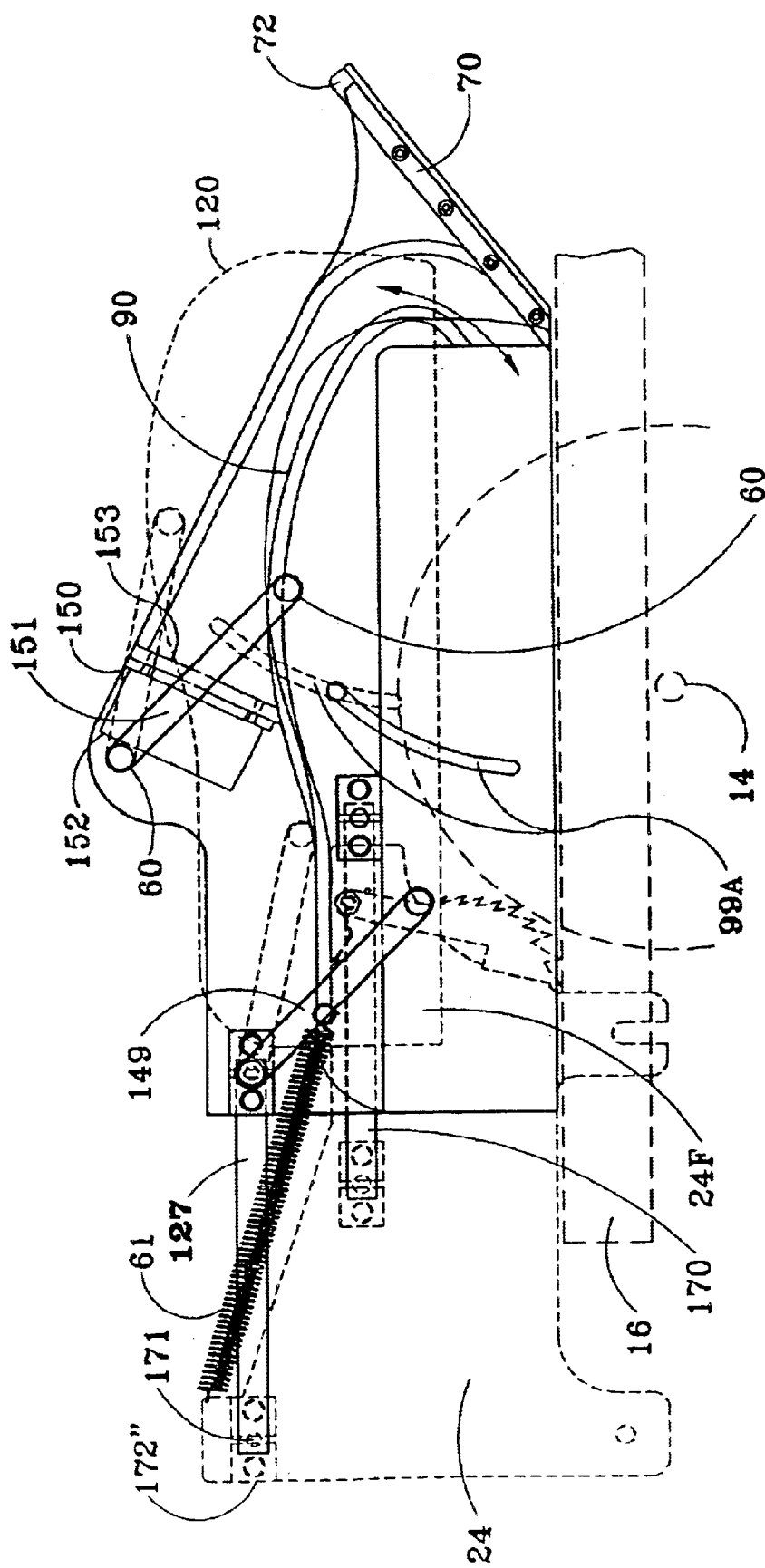
FIG. 7 is a left side elevational view of a second, alternative embodiment of the hood, pivotally connected by parallelogram linkage to the splitter, and shown in a lowered, working position, resting on the work table.
Figure 8:
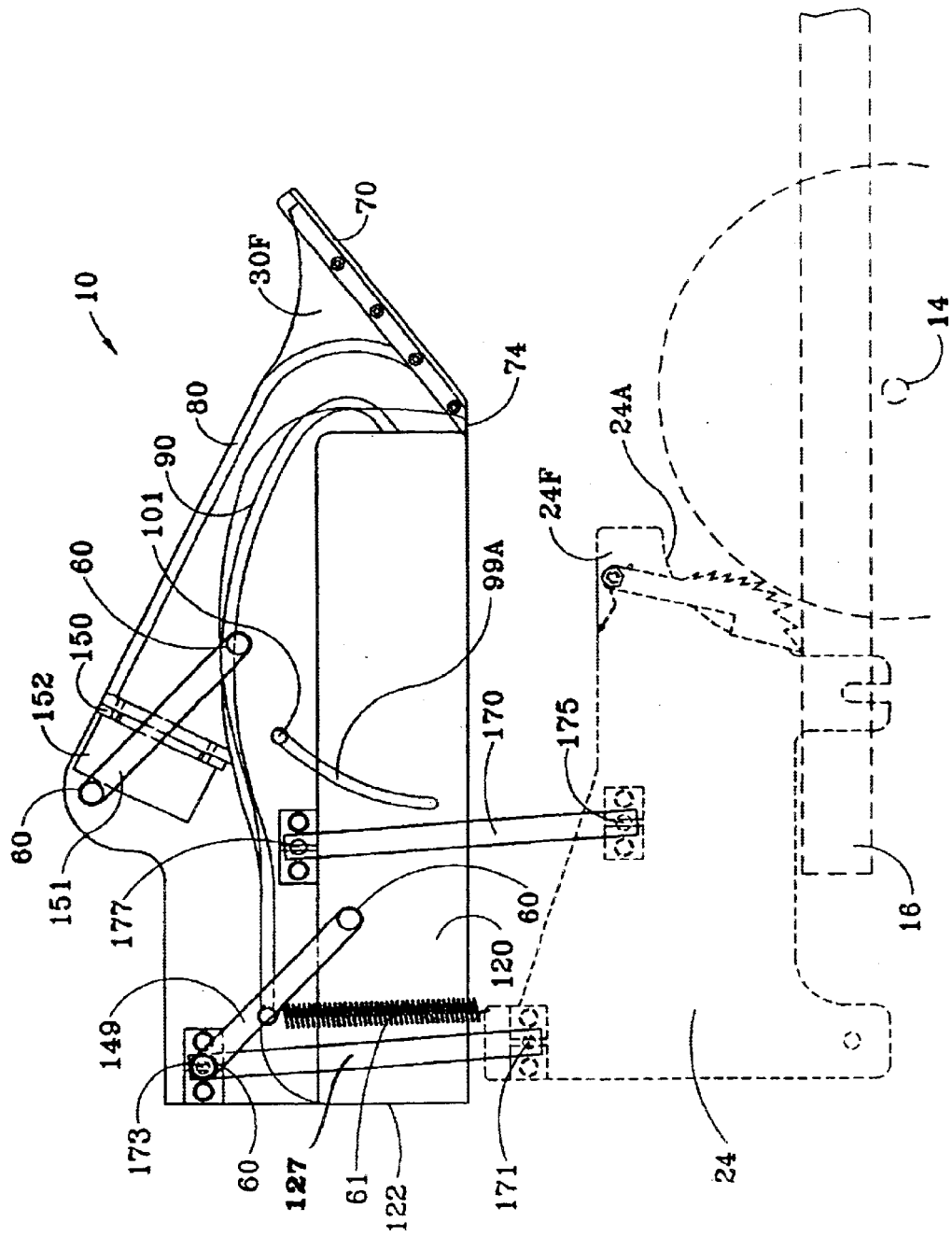
FIG. 8 is a left side elevational view thereof in a raised, retracted position.
Figure 9:
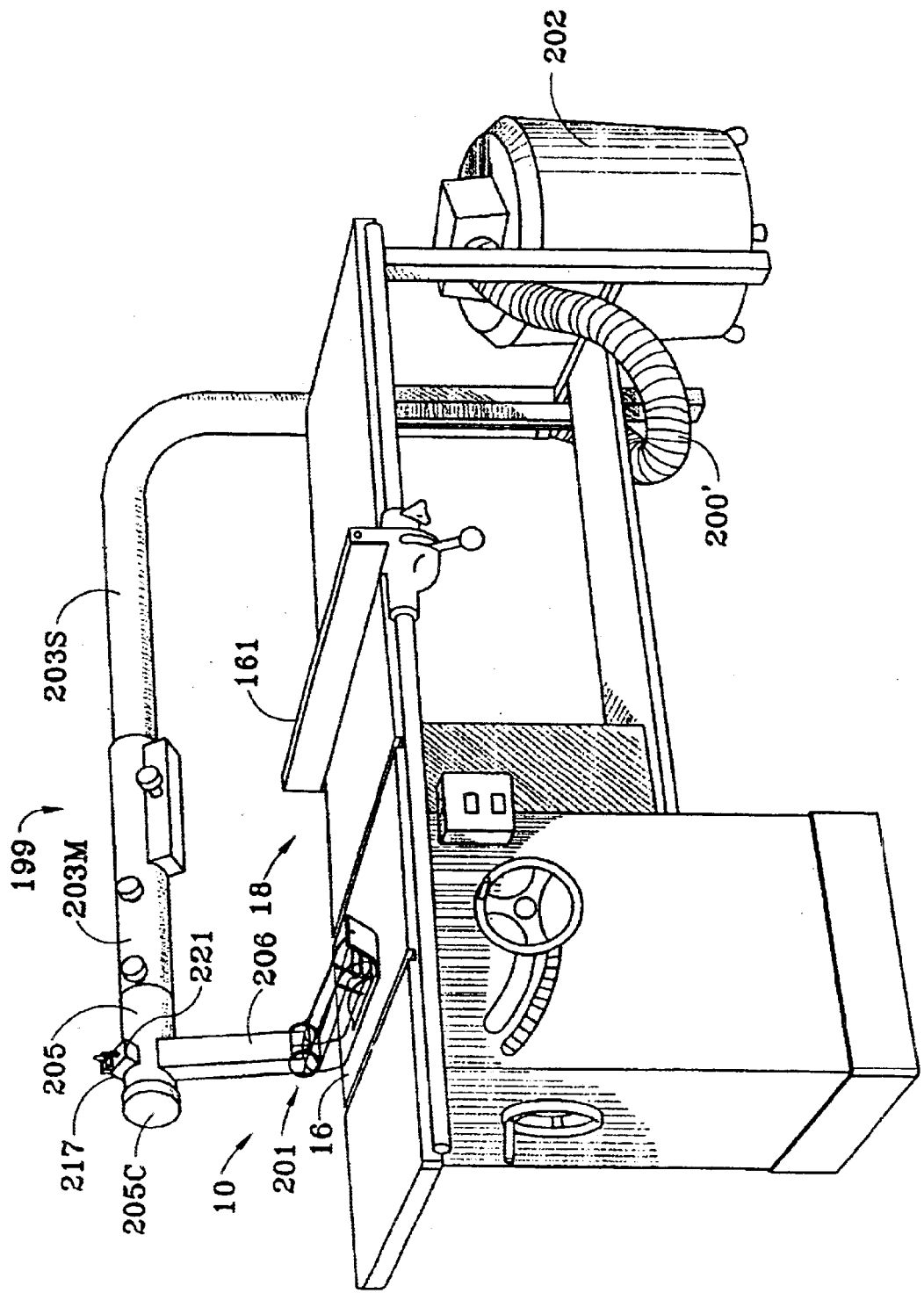
FIG. 9 is a perspective view of a rotary table saw as viewed from a position at the front, left of the saw, and showing the third embodiment of the movable, protective hood in a lowered, working position, and mounted by a collar joint to an overhead vacuum conduit assembly.
Figure 10:
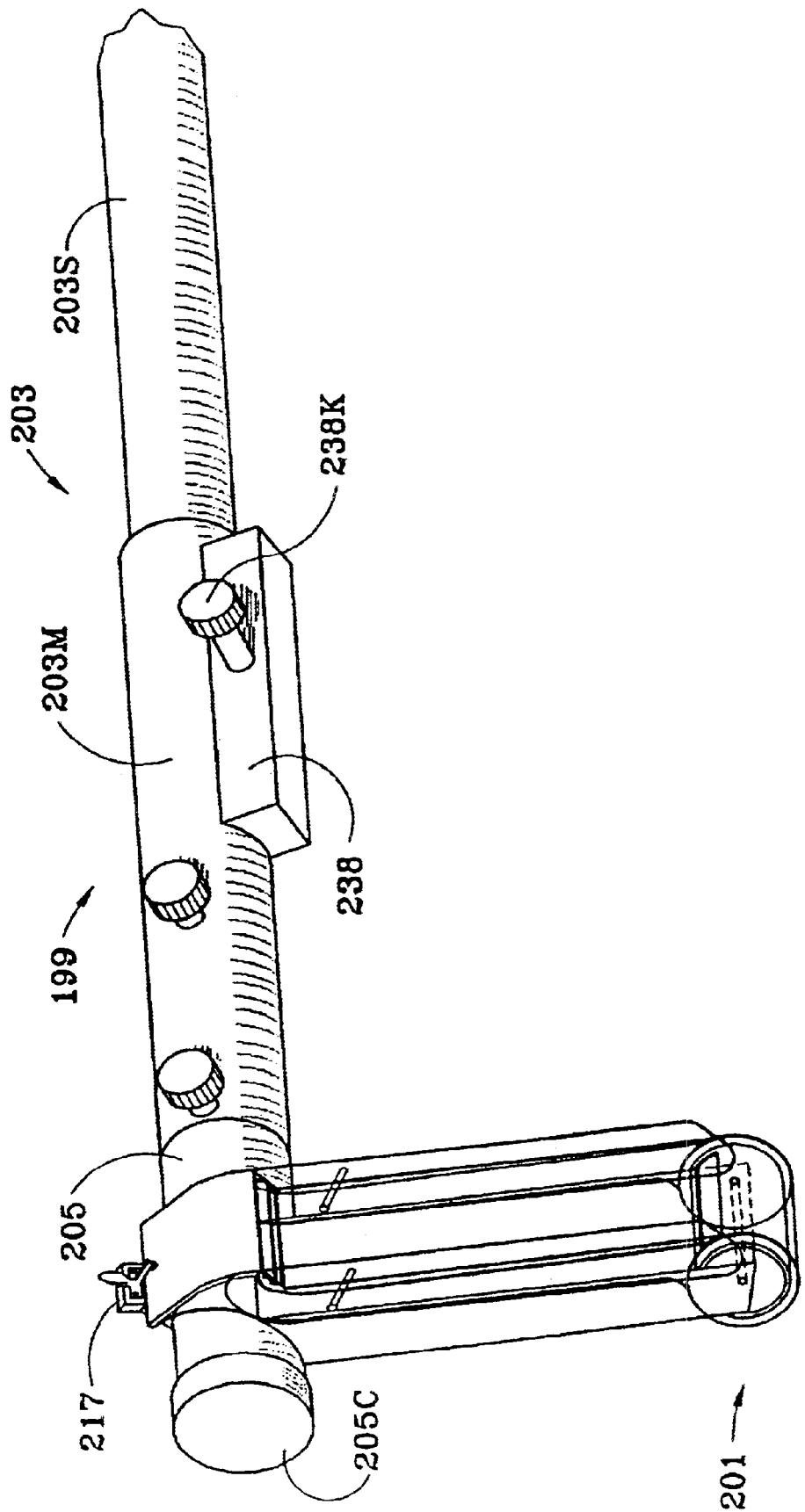
FIG. 10 is an enlarged, partial, left side perspective view, thereof, but with the hood in a raised, storage position.
Figure 11:
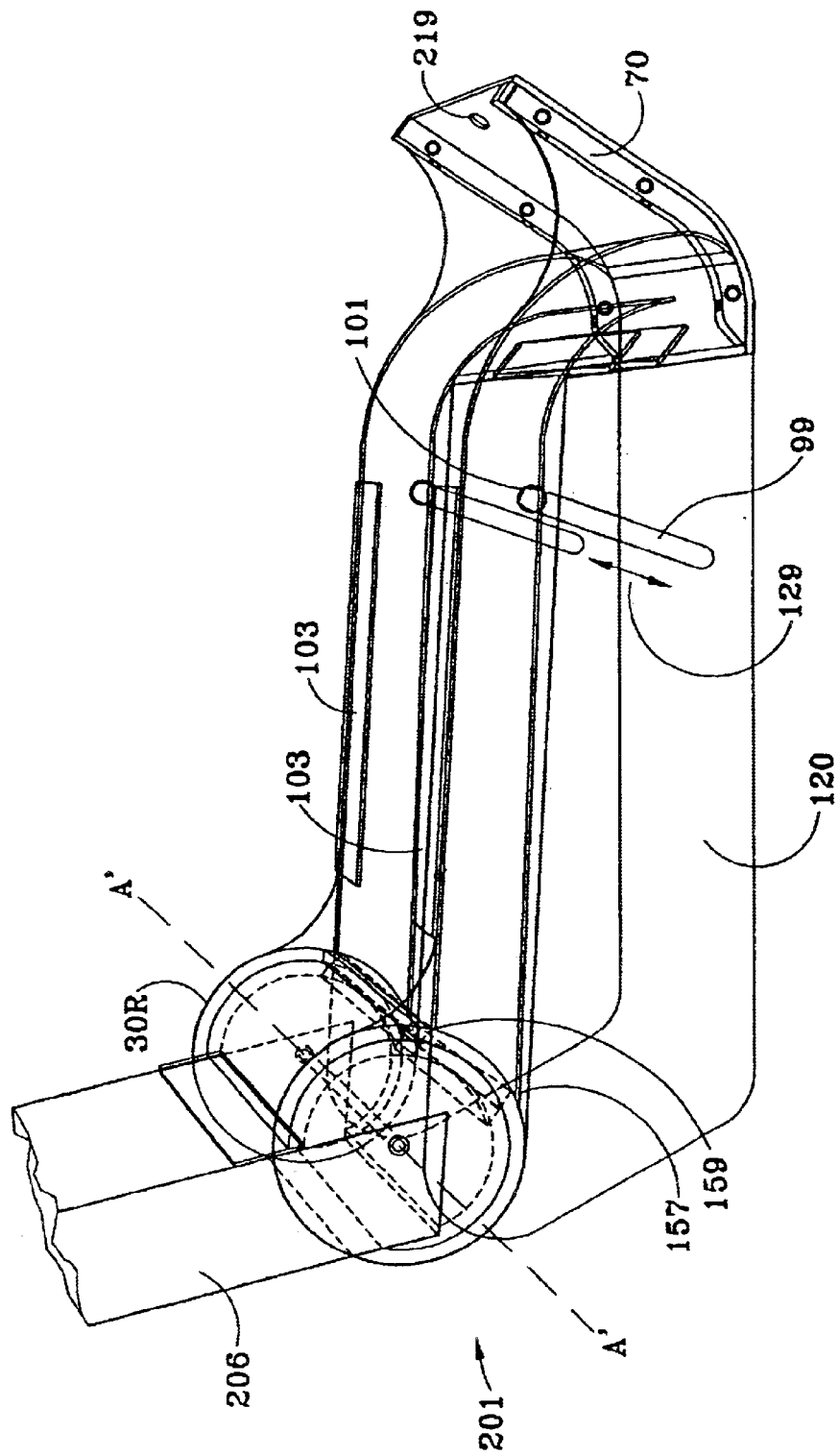
FIG. 11 is a further enlarged, left side perspective view of the hood, showing the collar joint in phantom outline.
Figure 12:
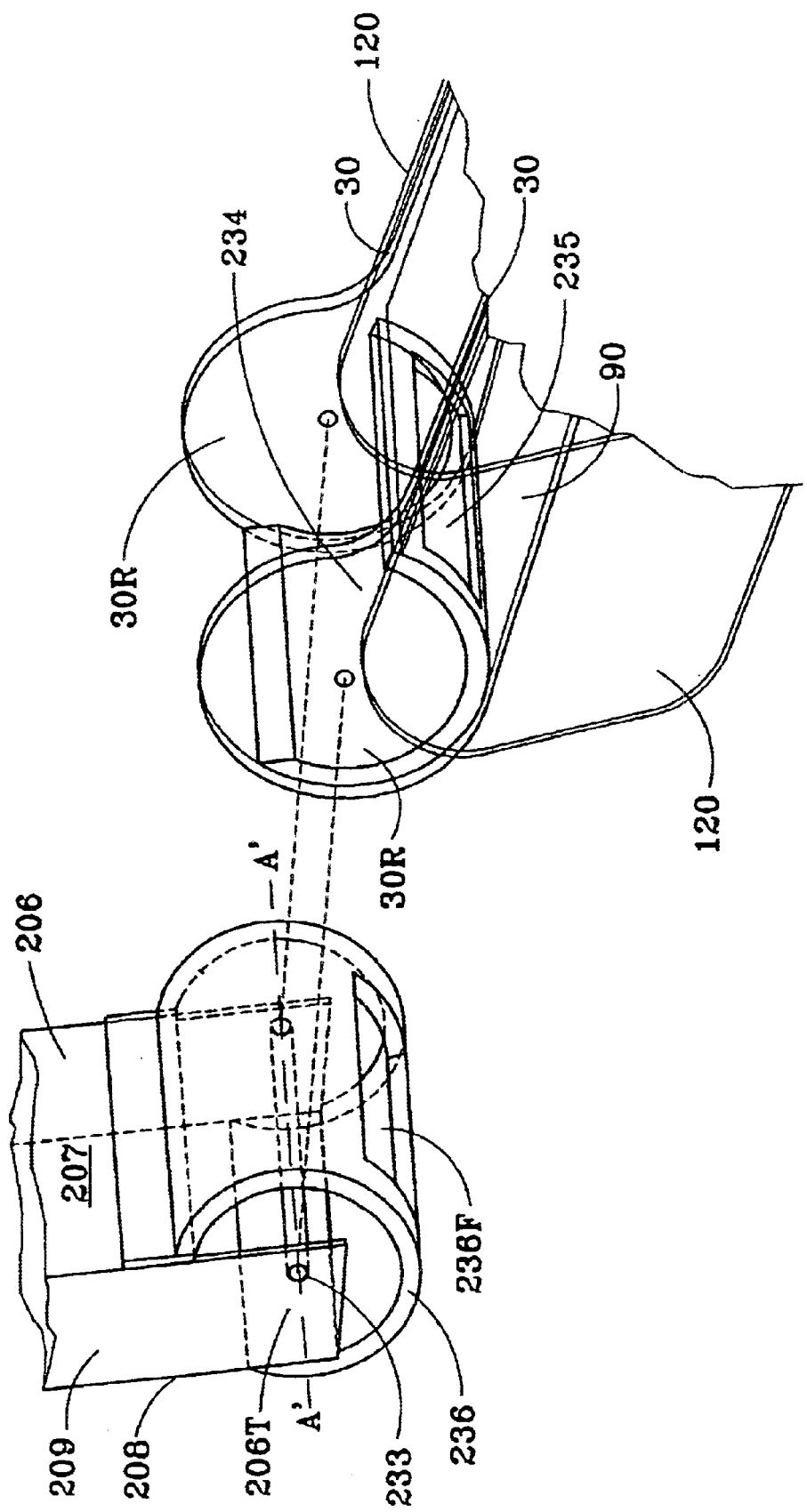
FIG. 12 is an enlarged, perspective view of a rear portion of the same hood, after removal of the collar pin and disassembly of the collar joint.
Figure 13A:
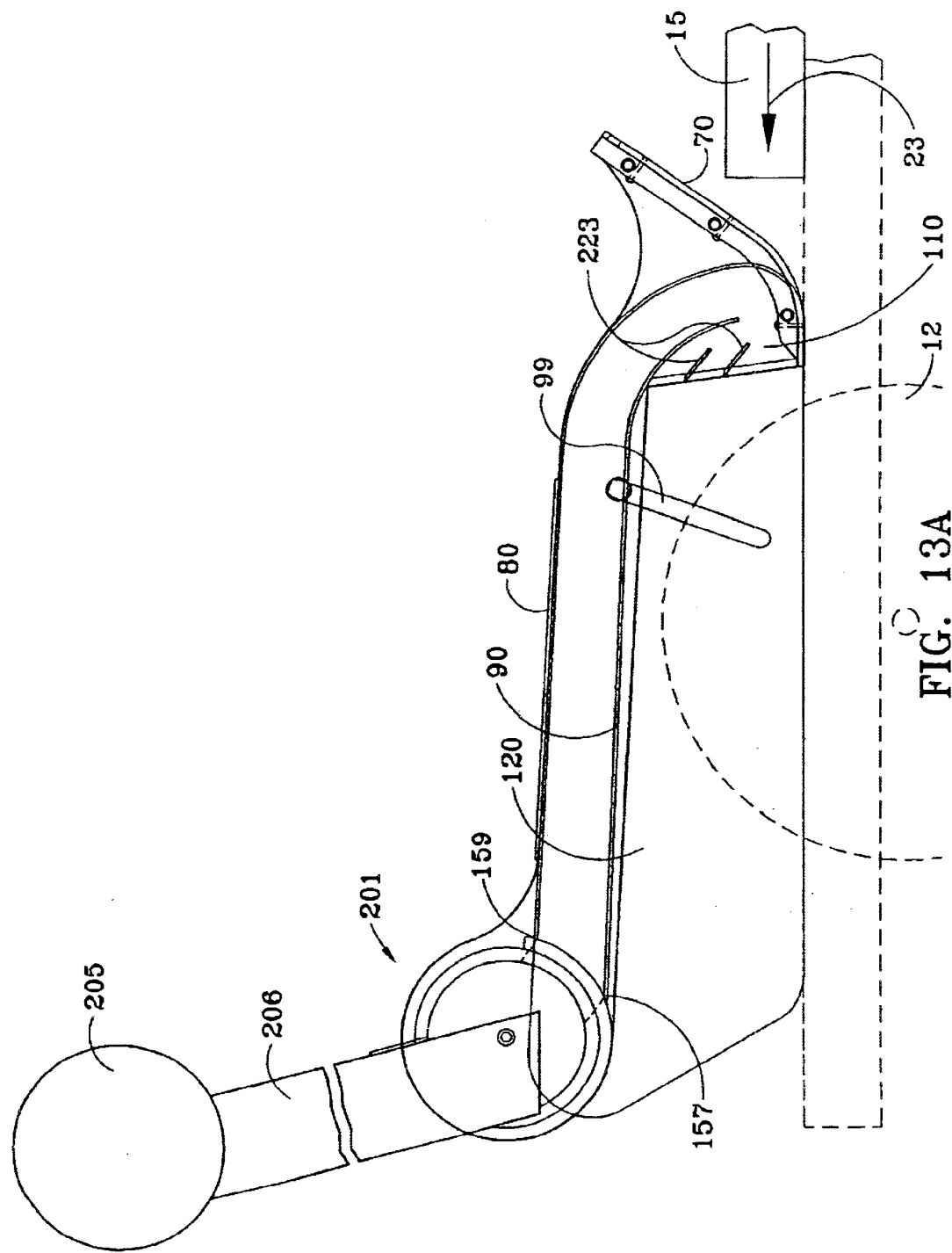
FIG. 13A is an enlarged, partial, left side elevational view thereof, showing the hood in a lowered, working position.
Figure 13B:
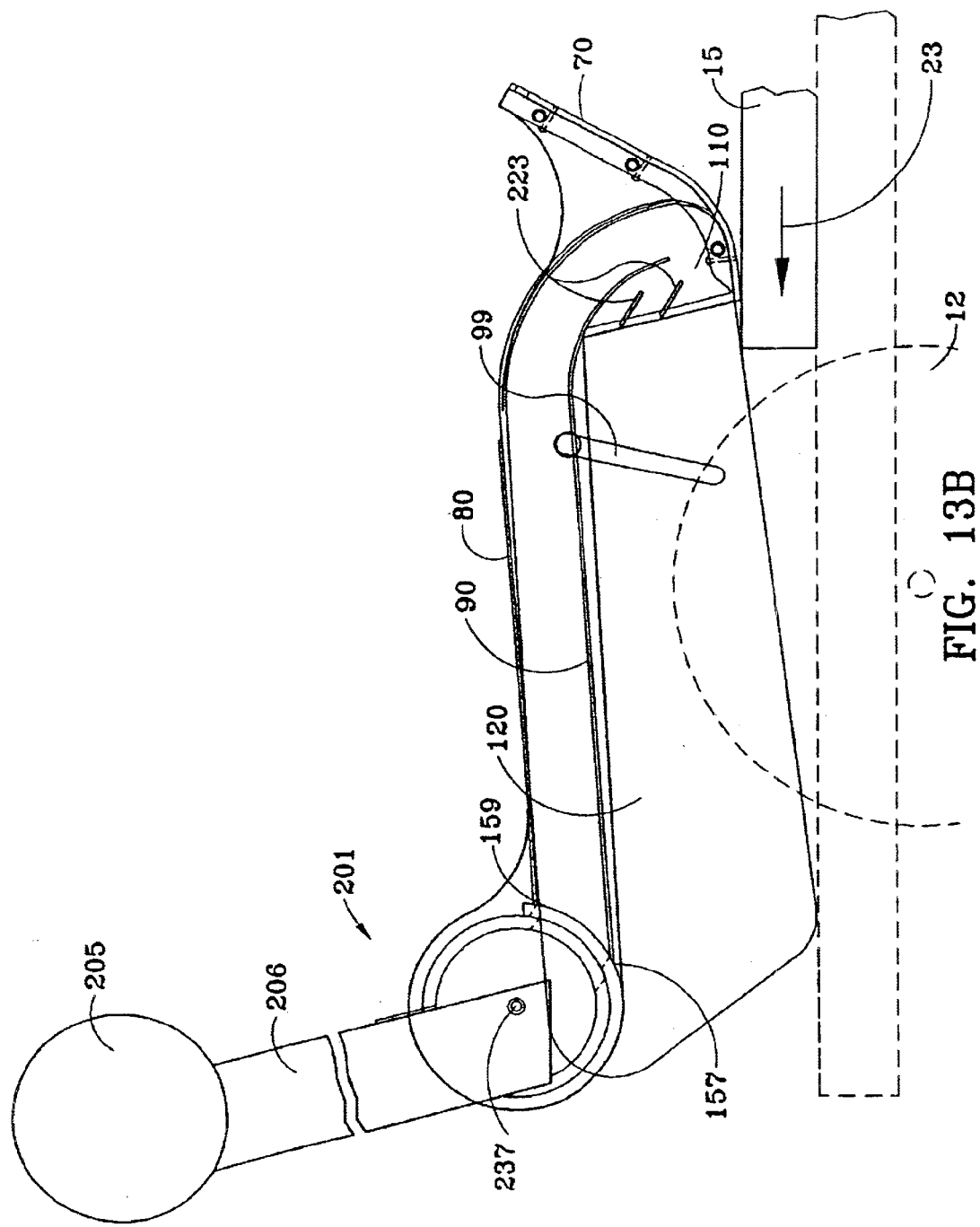
FIG. 13B is an enlarged, partial, left side elevational view thereof, showing the hood partially raised by a work piece advancing toward, but not yet in contact with, a rotating saw blade.
Figure 13D:
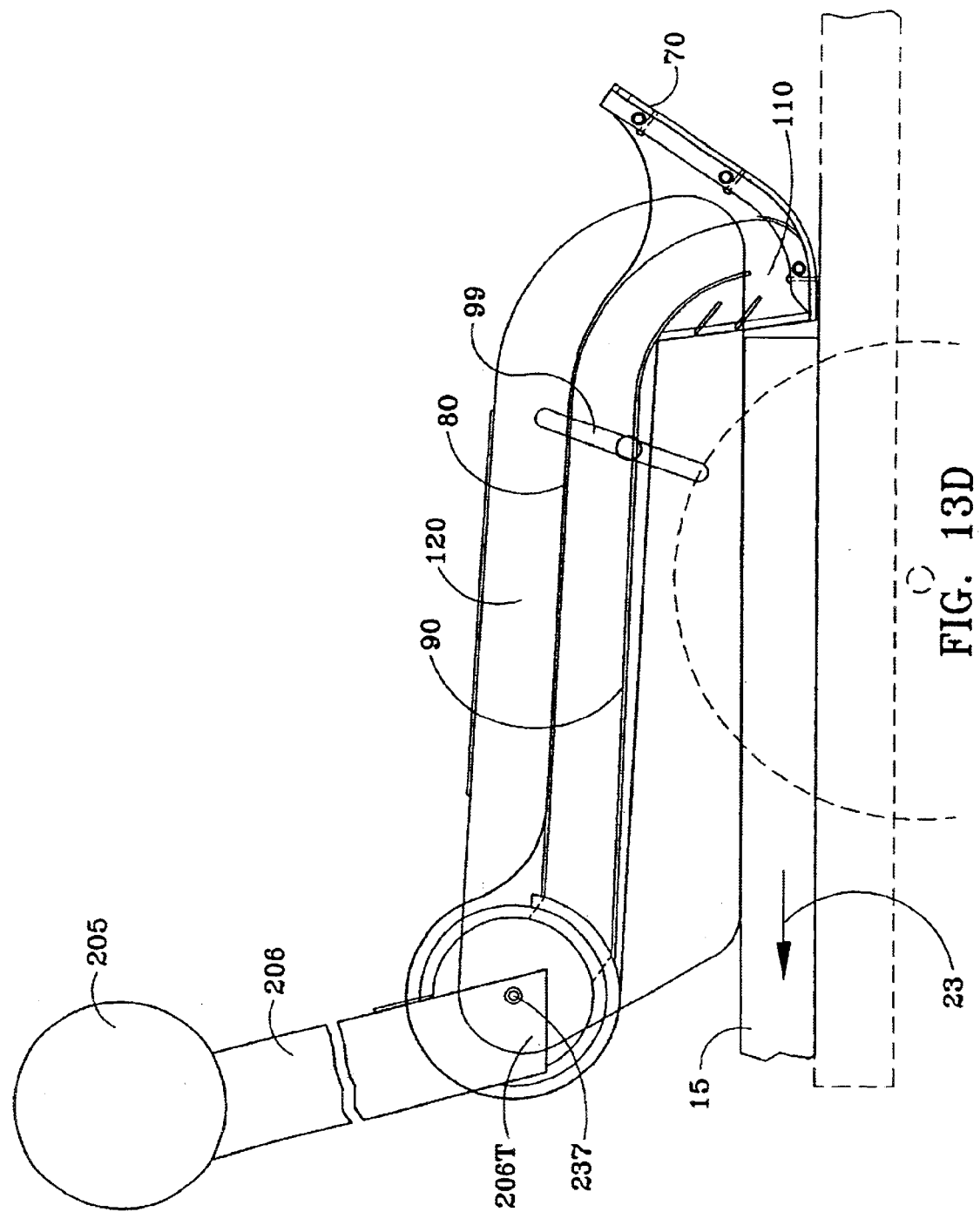
FIG. 13D is an enlarged, partial, left side elevational view thereof, showing the hood dropped down onto the work table just after the forwardmost portion of the work piece has cleared the nose panel, and further showing the side skirts still in a raised position relative to the nose panel.
Figure 13E:
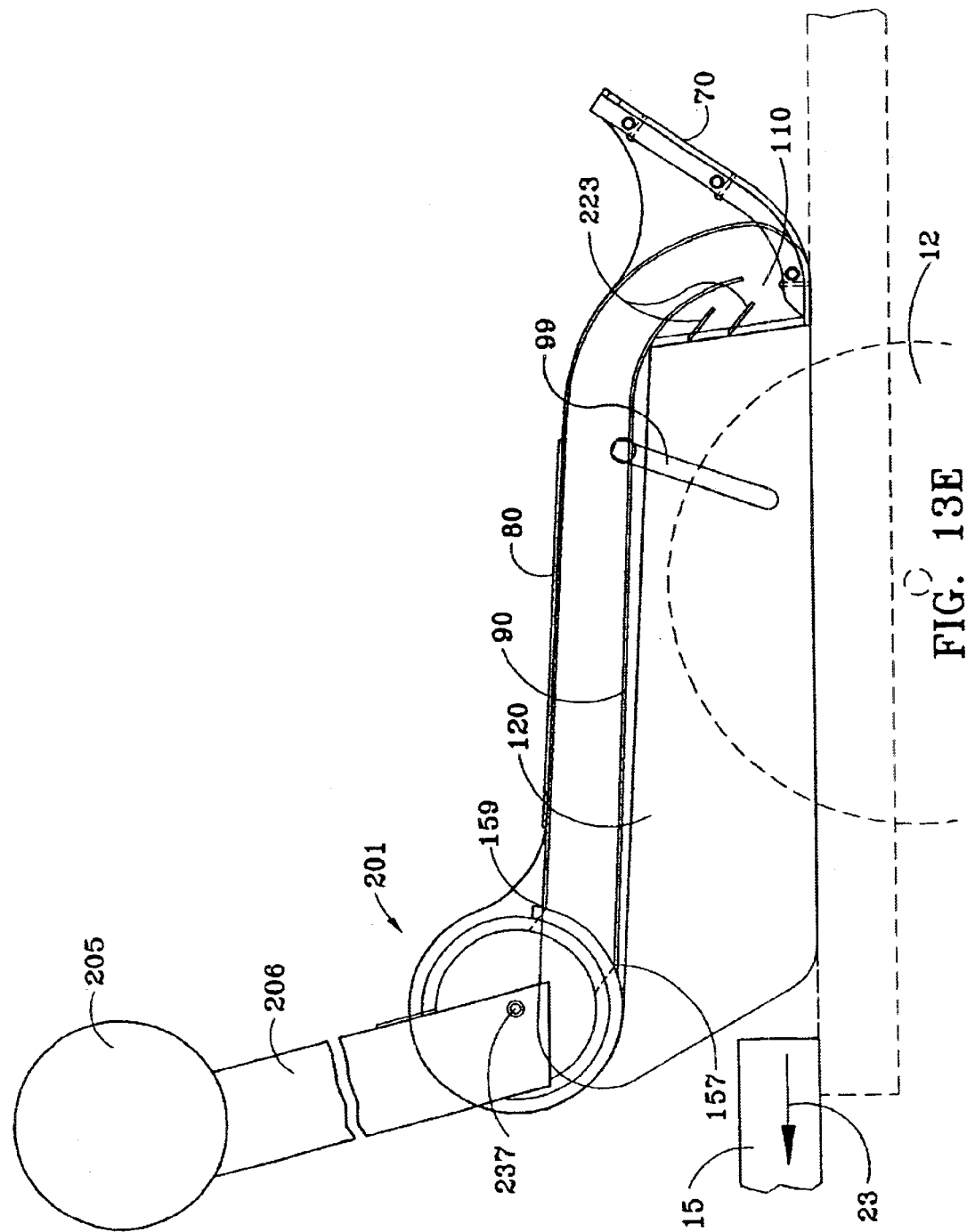
FIG. 13E is an enlarged, partial, left side elevational view thereof, showing the work piece having advanced further rearward, entirely clearing the hood, and the side skirts having dropped back down onto the work table.
Figure 15:
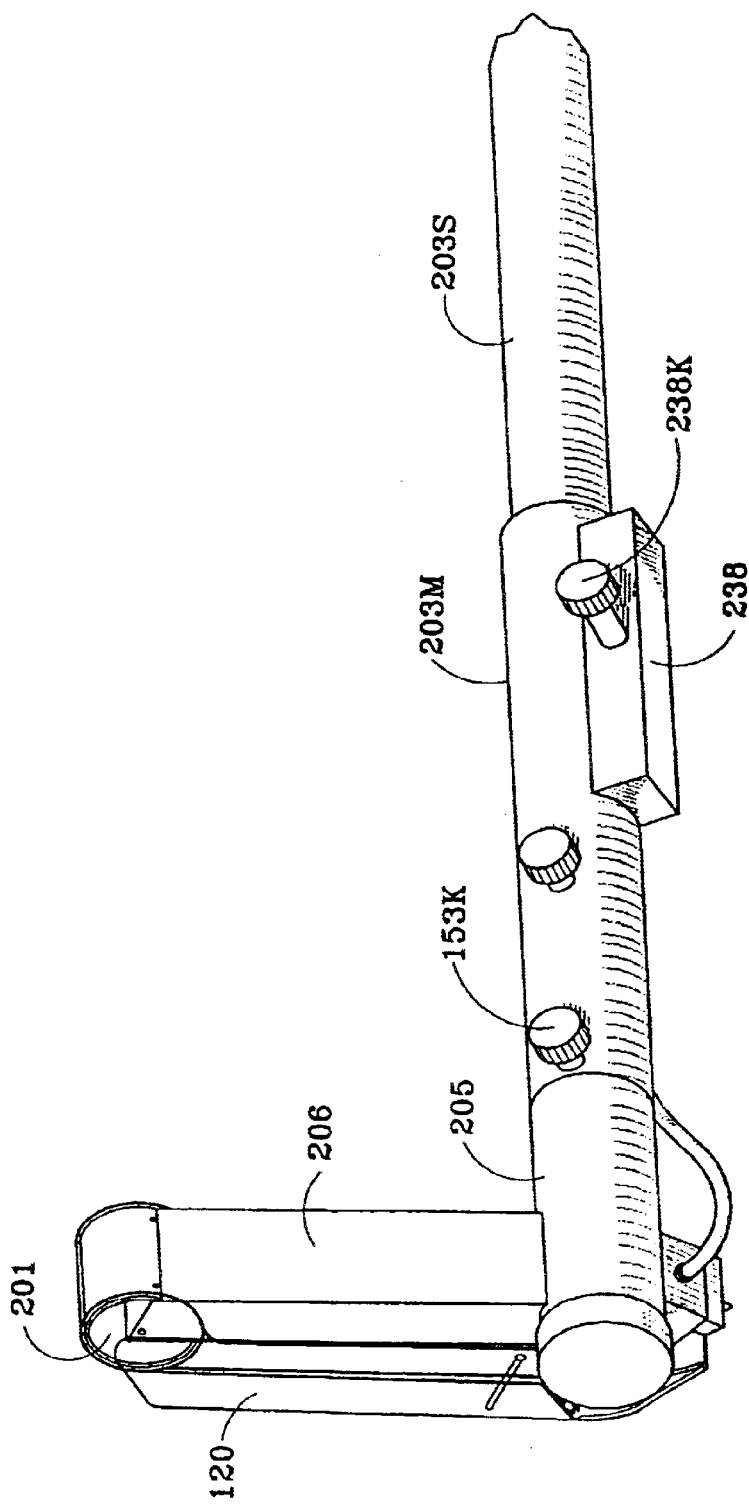
FIG. 15 is a left side view of the third embodiment of the hood, showing the head stock rotated up to a retracted position.

In a second, alternative embodiment of the hood 10, as depicted in FIGS. 7 and 8, the hood 10 is pivotally attached to the splitter 24 by a parallelogram linkage for movement between a raised, storage position (FIG. 8) and a lowered, working position (FIG. 7). The second embodiment includes a first parallel pair of equal-length, link arms 127, disposed on opposite sides of the splitter 24 and the hood 10. Each of the arms 127 has a first end pivotally attached to the splitter 24 by a first pivot pin 171 that extends laterally through aligned apertures in said first ends and the splitter 24, and each of the arms 127 has an opposite, second end pivotally attached to a side panel 30 by a second pivot pin 173. The second embodiment, however, further includes a second, parallel pair of equal-length link arms 170 disposed on opposite sides of the hood 10 and the splitter 24; each of the link arms 170 has a first end that is pivotally attached to a front portion 24F of the splitter 24 by a third pivot pin 175, and a second end pivotally attached to an inside surface of a side panel 30 below the lower cowl 90 by a fourth pivot pin 177. Thus, the second pair of link arms 170 cooperate with the first pair of link arms 127 to form a parallelogram linkage of the hood 10 to the splitter 24. A Optionally, a coil spring 61 is longitudinally mounted between the splitter 24 and a rear portion of the lower cowl 90, to assist in raising the hood 10 away from the work table 16. In the second embodiment, the means for suspending the side skirts 120 from the side panels 30 is modified from that of the first embodiment in two ways: first, each of the slots 99A is made arcuate; second, said suspension means further includes a parallelogram linkage of each side skirt 120 to the adjacent side panel 30. The parallelogram linkage of the side panels 30 to the adjacent side skirts 120 includes a first pair 151 and, longitudinally spaced-apart therefrom, a second pair 149 of parallel, equal-length, skirt support arms, the arms 151, 149 of each pair being disposed on opposite sides of the hood 10 and pivotally attached to the side panels 30 and to the adjacent side skirts 120. Preferably, each of the arms 151, 149 is apertured, as are the side panels 30, at each point of pivotal attachment, and each pivotal attachment is made by a fifth pivot pin 60 inserted therethrough.

In a third embodiment of the hood 10, depicted in FIGS. 9–15, the hood 10 is pivotally attached by a collar joint 201 to an overhead vacuum conduit assembly 199. The conduit assembly 199 includes a vacuum source 202 connected to an electric power source (not shown), a laterally disposed, elongated, cylindrical, hollow boom 203, and a hollow head stock 205 attached to one end of the boom 203. A movable vacuum hose 200 within the boom 203 has a discharge end that terminates in a ring seal 197 and an opposite, intake end that is normally stored within the head stock 205. The ring seal 197 has an outer diameter slightly less than the inner diameter of the boom 203 in order to maintain a vacuum throughout the interior of the boom 203. The ring seal 197 is slidable within the boom 203, its extent of travel being limited by a lock plate 153P within the head stock 205. A vacuum source 202 is attached to the discharge end of the boom 203 by a stationary hose 200' that inserts into an annular seal 39 at said discharge end. An intake duct 206 extends from the head stock 205 part way toward the work table 16. The interior of the intake duct 206 communicates with the interior of the head stock 205 and with the movable hose 200 therein. The intake duct 206 has a front wall 207 and a rear wall 208 joined by side walls 209 and terminates distally in an intake opening defined by the side walls 209, a rear wall 208, and a partially cutout, front wall 207, such that distal portions of the side walls 209 form tab extensions 206T of the intake duct 206. A first, semicylindrical, partial collar 236 is mounted between the tab extensions 206T of the intake duct 206 and is axially aligned on lateral axis A'—A'. The first partial collar 236 has front and rear openings 236F, 236R. The rear opening 236R of the partial collar 236 is defined by the distal margins of the front and rear walls 207, 208 of the intake duct 206; the front opening 236F of the collar 236 is diametrically opposite to the rear opening 236R.

The collar joint 201 further includes a second, semicylindrical, partial collar 234, coaxial with the first partial collar 236, that partially surrounds and engages a forward portion of the first partial collar 236. The second partial collar 234 is vertically disposed between a rear edge 157 of the lower cowl 90 and a rear edge 159 of the upper cowl 80, and is laterally disposed between rear portions of the side panels 30. A collar pin 237, aligned on axis A'—A', is inserted through apertures in the side panels 230 and through apertures 233 in the tab extensions 206T of the intake duct 206 for rotatably mounting the second partial collar 234 to the first partial collar 236 and the intake duct 206. The second partial collar 234 has an air discharge hole 235 that is in register with the front opening 236F of the first partial collar 236 whenever the hood 10 is moved to a lowered, working position; whereas, whenever the hood 10 is moved to a raised, storage position, the second partial collar 234 covers over and closes off the front opening 236F of the first partial collar 236. Accordingly, when the hood 10 is in a lowered, working position, saw dust and wood chips are conducted from the situs of cutting S by an air stream (denoted by arrows 21) through the orifice 110, rearwardly between the lower cowl 90 and the upper cowl 80, thence through the discharge opening 235 of the second partial collar 234, through the front and rear openings of the first partial collar 236F, 236R, through the intake duct 206 and vacuum hose 200 to a collection receptacle 202. For directional control of larger particulates generated at the cutting situs S, preferably one or more forwardly and downwardly inclined deflector panels 223 are placed above the entrance to the orifice 110, each of the deflector panels 223 being laterally disposed between the side panels 30.

The boom 203 of the vacuum conduit assembly 199 includes a stationary portion 203S and, in telescoping relation thereto, a laterally movable portion 203M that carries, and communicates with, the head stock 205. A rack and pinion assembly 238, equipped with an adjusting knob 238K, is attached to the stationary and movable portions of the boom 203S, 203M, respectively, to permit lateral adjustments of the position of the hood 10 with respect to the saw blade 12 and fence 161. A lock knob 238L inserted into threaded hole 238H reversibly locks portion 203M to portion 203S. For storing the hood 10 in a raised position adjacent the head stock 205, a spring catch 217 is mounted on the head stock 205 for insertion into a retainer aperture 219 in the nose panel 70. A normally closed, momentary switch 221, wired in series with the electric power source for the vacuum source, is attached to the head stock 205 adjacent to the spring catch 217, such that, whenever the hood 10 is raised to the storage position adjacent the head stock 205, the nose panel 70 depresses and opens the momentary switch 221, thereby de-energizing the vacuum source. The head stock 205 is provided with a removable cap 205C, whereby, with the cap removed, the intake end of the movable vacuum hose 200 may be withdrawn from the head stock 205 and used to vacuum clean the table saw 18 and its immediate environs, and thereafter replaced inside the head stock 205.

Figure 16:
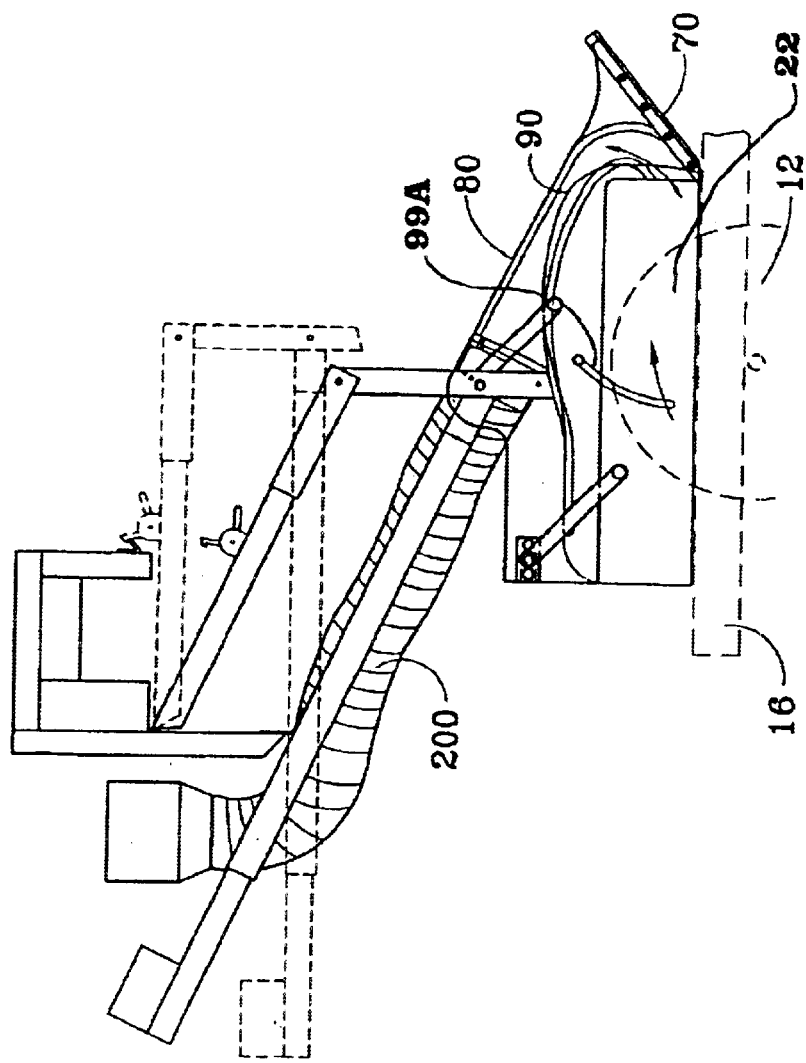
FIG. 16 is a left side view of the second embodiment of the hood attached by a parallelogram linkage and counterbalance to an overhead boom.

The head stock 205 and the attached intake duct 206 may also be rotated about a horizontal axis between a lowered position, shown in FIGS. 9–15, and a raised position, as shown in FIG. 16. For this purpose, the stock 205 has a circumferential slot 205S and a lock mechanism 153 comprising a lock plate 153P with an upstanding threaded shank that extends through the slot 205S, and a locking handle 153K with a threaded recess to receive the threaded shank.

The side panels 30, side skirts 120, upper cowl 80, lower cowl 90, and deflector panels 223, may be made out of any suitably rigid, durable material, but a transparent material, such as polycarbonate or LEXAN® plastic, is preferred. It will be appreciated that various modifications can be made to the exact form of the present invention without departing from the scope thereof. As a first example, the stop means 103 could be attached to the side panels 30 or elsewhere on the hood 10 instead of attached to the side skirts 120. As a second example, the hood 10 might be pivotally attached by a parallelogram linkage to an as overhead boom equipped with a counterbalance mechanism in a manner well known to those having skill in the art, such as is depicted in FIG. 16. Accordingly, it is intended that the disclosure be taken as illustrative only and not limiting in scope, and that the scope of the invention be defined by the following claims.

What is claimed is:

1. A vacuum system for removing sawdust from a worktable, the system comprising:

a rigid overhead conduit assembly configured for mounting over a worktable having a cutting area around a circular saw blade, the cutting area having a workpiece intake side, and the saw blade having a load cutting edge adjacent the workpiece intake side of the cutting area;

a vacuum source connected to the overhead conduit assembly;

a hood assembly pivotally connected to the conduit assembly, wherein the hood assembly can be lowered to substantially cover the cutting area, and alternately raised out of the way of the cutting area, the hood assembly having an air intake opening in front of the lead cutting edge of the saw blade for drawing air and debris from the cutting areas;

wherein the hood assembly has two side panels each side panel having a side skirt that pivots and slides relative to a single point on the side panel accommodate a workpiece moving through the cutting area, and to minimize air intake from outside the hood assembly, the air intake opening being permitted to drop behind a trailing edge of the workpiece while the side skirts are supported on a top surface of the workpiece while the workpiece moves through the cutting area.

2. The system of claim 1, wherein the vacuum source draws air and debris through the air intake, through the overhead conduit assembly to a debris collection chamber.

3. The system of claim 1, wherein each side panel is connected to the respective side skirt by a pivot pin and slot mechanism.

4. The system of claim 1, wherein the hood assembly is made of a material that is substantially transparent.

5. The system of claim 1, wherein the hood assembly has a forwardly inclined nose panel that first contacts a workpiece moving through the cutting area.

* * * * *